(12) United States Patent
Jeong et al.

(10) Patent No.: US 12,013,999 B2
(45) Date of Patent: Jun. 18, 2024

(54) ELECTRONIC DEVICE INCLUDING FLEXIBLE DISPLAY, WINDOW, AND TOUCH ELECTRODE IN ELECTRODE LAYER BETWEEN WINDOW AND FLEXIBLE DISPLAY, AND TOUCH CONTROL METHOD THEREFOR

(71) Applicant: Samsung Electronics Co., Ltd., Suwon-si (KR)

(72) Inventors: Hoyoung Jeong, Suwon-si (KR); Myunghoon Kwak, Suwon-si (KR); Moonsun Kim, Suwon-si (KR); Hojin Jung, Suwon-si (KR); Junhyuk Kim, Suwon-si (KR); Soyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/295,551

(22) Filed: Apr. 4, 2023

(65) Prior Publication Data
US 2023/0244339 A1    Aug. 3, 2023

Related U.S. Application Data

(63) Continuation of application No. PCT/KR2021/016640, filed on Nov. 15, 2021.

(30) Foreign Application Priority Data

Nov. 17, 2020 (KR) .................. 10-2020-0153969
Dec. 9, 2020 (KR) .................. 10-2020-0171651

(51) Int. Cl.
*G06F 3/041*    (2006.01)
*G06F 3/044*    (2006.01)

(52) U.S. Cl.
CPC .......... *G06F 3/0416* (2013.01); *G06F 3/0443* (2019.05); *G06F 2203/04102* (2013.01)

(58) Field of Classification Search
CPC ................. G06F 3/0416; G06F 3/0443; G06F 2203/04102
See application file for complete search history.

(56) References Cited

U.S. PATENT DOCUMENTS 10,229,649 B2    3/2019  Park et al.
10,602,623 B1 *  3/2020  Myers ................. G06F 3/147
(Continued)

FOREIGN PATENT DOCUMENTS

EP        3 598 425 A1     1/2020
KR    10-2015-0003380 A    1/2015
(Continued)

OTHER PUBLICATIONS

Extended European Search Report dated Jan. 23, 2024, issued in European Patent Application No. 21895039.2-1224.

Primary Examiner — Afroza Chowdhury
(74) Attorney, Agent, or Firm — Jefferson IP Law, LLP

(57) ABSTRACT

An electronic device and a touch control method therefor are provided. The electronic device includes a housing, a flexible display that is drawn into or out of the housing by a sliding operation, a transparent window disposed in the housing so that a partial region of the flexible display drawn into the housing passes therethrough, and a transparent electrode layer disposed between the transparent window and the flexible display. At least one first touch electrode may be disposed in the transparent electrode layer. The at least one first touch electrode disposed in the transparent electrode layer may be activated. At least one second touch electrode arranged in the partial region of the flexible display may be deactivated.

17 Claims, 24 Drawing Sheets

(56) References Cited

U.S. PATENT DOCUMENTS

| | | |
|---|---|---|
| 10,684,714 B2 | 6/2020 | Seo et al. |
| 10,949,003 B2 | 3/2021 | Kim et al. |
| 2007/0211036 A1 | 9/2007 | Perkins |
| 2013/0036638 A1 | 2/2013 | Kwack et al. |
| 2013/0127917 A1 | 5/2013 | Kwack et al. |
| 2013/0314387 A1 | 11/2013 | Kwack et al. |
| 2013/0314762 A1 | 11/2013 | Kwack et al. |
| 2013/0328792 A1 | 12/2013 | Myers et al. |
| 2017/0060183 A1 | 3/2017 | Zhang et al. |
| 2017/0168638 A1 | 6/2017 | Shi et al. |
| 2017/0196102 A1 | 7/2017 | Shin et al. |
| 2018/0348881 A1* | 12/2018 | Chung .................. H04W 88/02 |
| 2018/0364827 A1* | 12/2018 | Chung .................. G06F 1/1677 |
| 2020/0103476 A1 | 4/2020 | Shin et al. |
| 2020/0209924 A1* | 7/2020 | Zuo ..................... G06F 3/04883 |

FOREIGN PATENT DOCUMENTS

| | | |
|---|---|---|
| KR | 10-2017-0048007 A | 5/2017 |
| KR | 10-2017-0081347 A | 7/2017 |
| KR | 10-2017-0136951 A | 12/2017 |

* cited by examiner

ELECTRONIC DEVICE INCLUDING FLEXIBLE DISPLAY, WINDOW, AND TOUCH ELECTRODE IN ELECTRODE LAYER BETWEEN WINDOW AND FLEXIBLE DISPLAY, AND TOUCH CONTROL METHOD THEREFOR

CROSS-REFERENCE TO RELATED APPLICATION(S)

This application is a continuation application, claiming priority under § 365(c), of an International application No. PCT/KR2021/016640, filed on Nov. 15, 2021, which is based on and claims the benefit of a Korean patent application number 10-2020-0153969, filed on Nov. 17, 2020, in the Korean Intellectual Property Office, and of a Korean patent application number 10-2020-0171651, filed on Dec. 9, 2020, in the Korean Intellectual Property Office, the disclosure of each of which is incorporated by reference herein in its entirety.

BACKGROUND

1. Field

The disclosure relates to an electronic device including a flexible display and a touch control method therefor.

2. Description of Related Art

Recently, a use of a flexible-type electronic device (e.g., a smartphone) capable of changing a physical shape of a screen area has expanded. The flexible-type electronic device may increase a screen size to provide a wide screen as necessary while maintaining a portability by employing a structure (e.g., a rolling or sliding structure) capable of extending or contracting a screen area.

A mechanical state of the flexible-type electronic device may be changed by a user's operation (e.g., a sliding operation). For example, in the case of a slidable-type electronic device, a part of a display may be changed from a reduced state in which the display is slid into the electronic device to an extended state in which the display is slid out.

The above information is presented as background information only to assist with an understanding of the disclosure. No determination has been made, and no assertion is made, as to whether any of the above might be applicable as prior art with regard to the disclosure.

SUMMARY

A flexible-type electronic device may include a cover structure (e.g., a lateral cover window and a rear cover window) for covering a portion of a display to protect a screen area of the display.

A mechanical state (extended state/contracted state) of the flexible-type electronic device is frequently changed and a use of a screen of a display in a slide-in state may often occur.

Due to the mechanical characteristics, a use of a cover structure may be required for improving usability of the flexible-type electronic device without a restriction according to the mechanical state (extended state/contracted state).

In case of the part of the screen area of the display covered by the cover structure, a touch function may be deteriorated due to an air gap between the cover structure and a front surface of the display and a thickness of the cover structure.

As a touch pattern is refined, a sensing interval is reduced, and thus in the case of high-performance electronic devices, a degree of degradation in touch performance due to the cover structure may be greater.

In relation to the cover structure, in case that a separate touch structure or a sub display structure is employed, required components (e.g., a touch sensor and a touch detection sensor) are added, leading an increase in a consumption current and material costs.

Aspects of the disclosure are to address at least the above-mentioned problems and/or disadvantages and to provide at least the advantages described below. Accordingly, an aspect of the disclosure is to provide an electronic device including a flexible display and a touch control method therefor, which may improve usability of the electronic device by simply using a cover structure exposed to the outside without restriction due to a mechanical state (extended state/contracted state) of the flexible-type electronic device.

Another aspect of the disclosure is to provide an electronic device including a flexible display and a touch control method therefor, which may improve a touch function regardless of a cover structure.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a flexible display that is drawn into the housing or drawn out from the housing by a sliding operation, a transparent window disposed in the housing so that a partial area of the flexible display drawn into the housing is projected therethrough, and a transparent electrode layer disposed between the transparent window and the flexible display. At least one first touch electrode may be disposed in the transparent electrode layer.

In accordance with another aspect of the disclosure, a touch control method for an electronic device is provided. The touch control method includes a housing, a flexible display slidably coupled to the housing, a transparent window disposed in the housing so that a partial area of the flexible display is projected therethrough, and a transparent electrode layer disposed between the transparent window and the flexible display, the touch control method including an operation of activating at least one first touch electrode disposed on the transparent electrode layer, an operation of deactivating at least one second touch electrode disposed on a partial area of the flexible display, and an operation of performing control so that the at least one first touch electrode is matched the at least one second touch electrode.

According to various embodiments, usability of an electronic device may be improved by simply using a cover structure exposed to the outside without restriction due to a mechanical state (extended state/contracted state) of a flexible-type electronic device.

According to various embodiment, a touch function may be improved regardless of a cover structure of a flexible-type electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The accompanying drawings are for explaining a structure (e.g., a mechanical structure and a touch structure) and/or a control scheme (e.g., an electrode matching scheme and a touch control scheme) of an electronic device according to various embodiments, only for helping understanding of the structure or scheme illustrated through the drawings, and a scope of the embodiments is not limited to a specific structure or method. For example, in a certain state (e.g., a basic state, an extending state, and a contracting state) of the electronic device, various embodiments configured so that at least a portion of a flexible display may be projected through a transparent window are possible.

The electronic device according to various embodiments may be an electronic device including a flexible display extendable/contractible in at least one direction. By way of example, the electronic device according to various embodiments may correspond to one of a horizontal/vertical sliding type electronic device, a multi-axis sliding type electronic device capable of sliding in both directions around multiple axes, and a rollable-type electronic device.

Figure 1A:
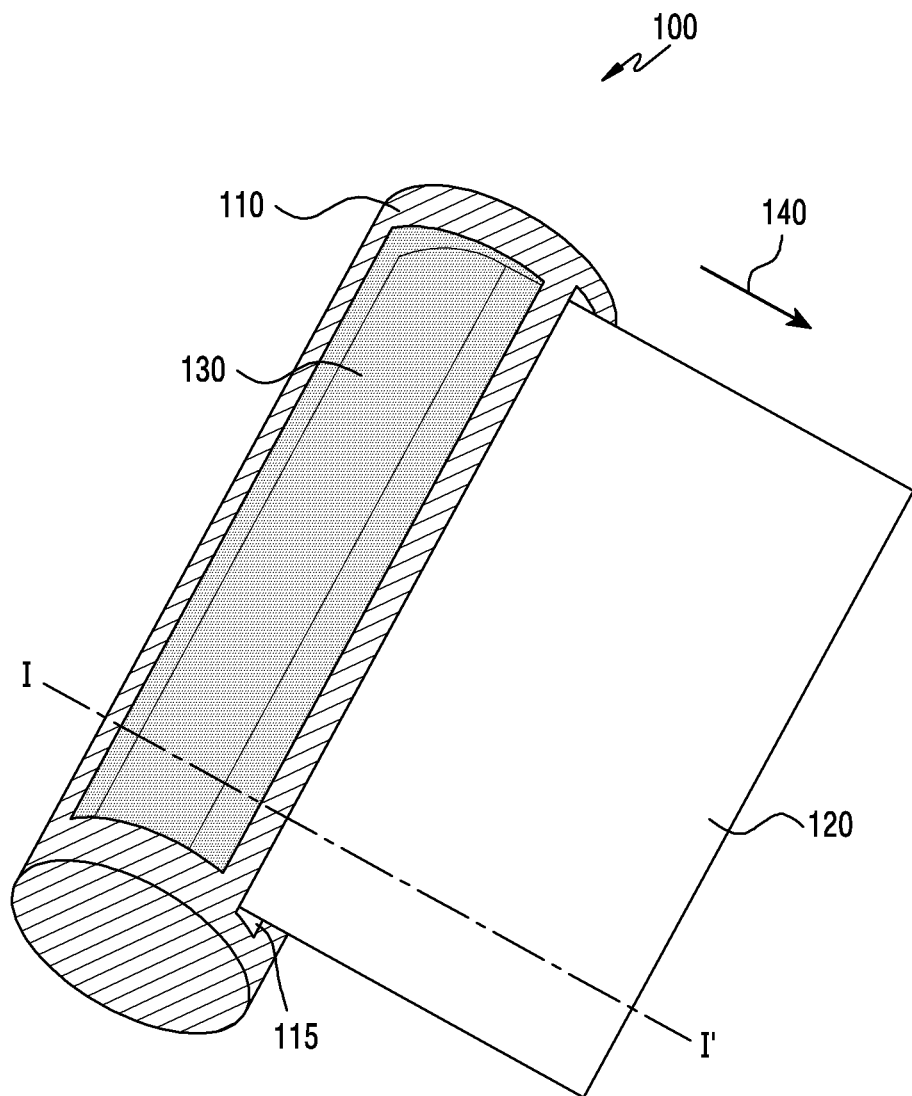
FIG. 1A illustrates a perspective view of an electronic device according to an embodiment of the disclosure.
Figure 1B:
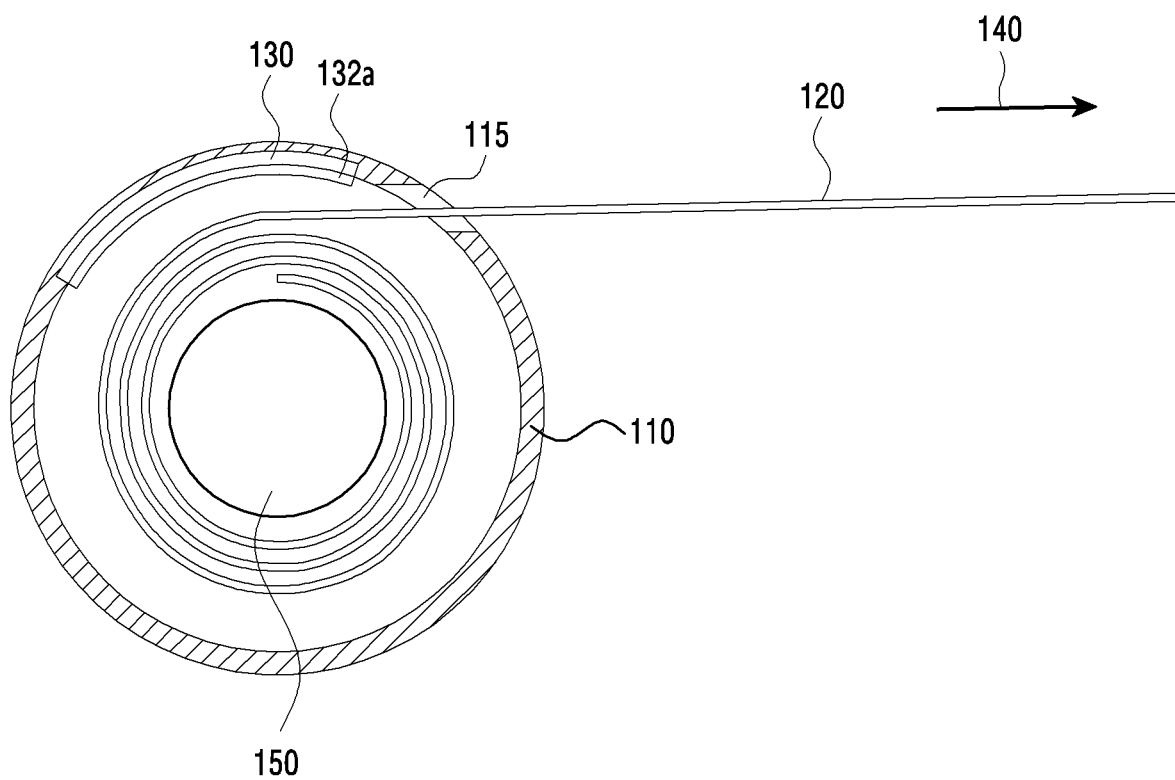
FIG. 1B illustrates a sectional view of an electronic device according to an embodiment of the disclosure.

FIG. 1A illustrates a perspective view of an electronic device according to an embodiment of the disclosure. FIG. 1B is a sectional view of the electronic device and illustrates a section of the electronic device of FIG. 1A taken along line I-I' according to an embodiment of the disclosure.

Referring to FIGS. 1A and 1B, an electronic device 100 may include a housing 110, a flexible display 120, a transparent window 130 disposed on the housing 110. For example, the flexible display 120 may be, but is not limited to, a rollable display.

The flexible display 120 may be coupled to a rotation body 150 which is a guiding structure in the housing 110 to be drawn into the housing 110 by a sliding-in operation and drawn out from the housing 110 by a sliding-out operation. For example, the housing 110 of the electronic device 100 may be formed in a cylindrical shape to allow the flexible display 120 to be rolled according to the rotation body 150 in the housing 110.

For example, the housing 110 may form a partial exterior of the electronic device 100. The housing 110 may be formed to have a predetermined length in a first direction (e.g., the vertical direction) and a predetermined width in a second direction (e.g., the horizontal direction). The transparent window 130 may be disposed on a portion of an outer surface of the housing 110. An opening 115 may be disposed on a portion of the outer surface of the housing 110. The housing 110 may include the rotation body 150 inside thereof for rolling of the flexible display 120.

The flexible display 120 may be drawn into the housing 110 by a sliding-in operation or drawn out from the housing 110 by a sliding-out operation. The flexible display 120 may be coupled to the rotation body 150 in the housing 110 to slide within a predetermined range with respect to the housing 110. At least a portion of the flexible display 120 may be exposed to the outside of the housing 110 through the opening 115 on the housing 110.

The housing 110 may include the rotation body 150 at the center thereof corresponding to a guide structure for guiding a sliding operation of the flexible display 120 through rolling. The rotation body 150 may serve as a central axis while rotating in a clockwise direction or counterclockwise direction during a sliding-in/sliding-out operation of the flexible display 120.

The flexible display 120 may be drawn into/out into/from the housing 110 by the sliding operation around the rotation body 150 as the central axis in the housing 110. By way of example, the flexible display 120 may be unwound from the rotation body 150 rolling in the clockwise direction to be slid out so as to be drawn to the outside of the housing 110. By way of example, the flexible display 120 may be wound around the rotation body 150 rolling in the counterclockwise direction to be slid in so as to be drawn into the housing 110.

The electronic device 100 may be in an extension state in which at least a portion of the flexible display 120 is drawn out from the housing 110 in a first direction 140 (extension direction or horizontal direction) facing the outside of the housing by a sliding-out operation. The electronic device may be in a contraction state in which at least a portion of the flexible display 120 is drawn into the housing 110 in a second direction facing the inside of the housing by a sliding-in operation.

As the flexible display 120 slides while rotating around the rotation body 150 as the central axis inside the housing 110 to move in the first direction 140 or the second direction opposite to the first direction 140, a whole size of the electronic device 100 or a size of the flexible display 120 exposed to the outside of the housing 110 may be increased or reduced. In case that the flexible display 120 moves in the first direction 140 from the housing 110, the whole size of the electronic device 100 or the size of the flexible display 120 exposed to the outside of the housing 110 may be increased. In case that the flexible display 120 moves in the second direction opposite to the first direction 140 to the housing 110, the whole size of the electronic device 100 or the size of the flexible display 120 exposed to the outside of the housing 110 may be reduced.

The opening 115 may be formed through a portion of the housing 110 to allow drawn-in and drawn-out of the flexible display 120. During the sliding operation, the flexible display 120 may be drawn out to the outside of the housing 110 or drawn into the housing 110 through the opening 115 on the housing 110.

By the sliding operation, a mechanical state of the electronic device 100 or the flexible display 120 may be changed. For example, the mechanical state (sliding state, extension/contraction state) of the electronic device 100 may correspond to one of a basic state (complete drawn-in state or complete contraction state) in which the whole area of the flexible display 120 is drawn into the housing 110, an intermediate state (contracting state or extending state) in which a portion of the flexible display 120 is drawn into the housing 110 and the other portion thereof is drawn out to the outside of the housing 110, and an extension state (complete drawn-out state or complete extension state) in which substantially the entirety (e.g., 90% or more) of the flexible display 120 is drawn out to the outside of the housing 110.

The flexible display 120 may include a touch area for providing a touch function. The touch area may include multiple electrodes (transmission electrodes and reception electrodes) for detecting a touch. The touch area may be operated according to a processor (e.g., processor 210 in FIG. 2A). The touch area may be formed corresponding to the entirety of a screen area of the flexible display 120. By way of example, the flexible display 120 may include a display layer configuring a screen area and a touch detection layer stacked on the display layer and configuring the touch area.

The transparent window 130 may be disposed on a portion of the housing 110. The transparent window 130 may be disposed on the housing 110 to allow a partial area of the flexible display 120 drawn into the housing 110 to be projected therethrough. The partial area may be an overlapping area with respect to the transparent window 130. The partial area may be referred to as a projection area (visible area) or an overlapping area. At least one touch electrode (reception electrode or transmission electrode) may be arranged on the transparent window 130. In a state (e.g., the basic state and the intermediate state) in which at least a portion of the flexible display 120 is drawn into the housing 110, the transparent window 130 may be disposed to overlap a partial area of the flexible display 120 to allow the partial area to be projected.

A transparent electrode layer 132a may be disposed between the transparent window 130 and the flexible display 120. By way of example, the transparent electrode layer 132a may be stacked on one surface (e.g., an internal surface) of the transparent window 130 facing a partial area (projection area) of the flexible display 120. The transparent electrode layer 132a may include at least one touch electrode (transmission/reception electrode).

Depending on the sliding operation of the flexible display 120, a location of the projection area overlapping the transparent window 130 or at least one touch electrode (transmission/reception electrode) on the transparent window 130 may be changed.

The electronic device 100 may include the rotation body 150 capable of fixing the flexible display 120 and rolled to guide the sliding operation of the flexible display 120. The rotation body 150 may include a circuit structure such as a printed circuit board or a battery inside thereof.

Although not shown in the drawing, the electronic device 100 may include a sensor structure (e.g., a distance sensor, an extension/contraction state detection sensor, Hall sensors, and/or a magnetic material) for detecting a moving distance (e.g., an extension/contraction distance) or a mechanical state (e.g., an extension/contraction state) of the flexible display 120. The electronic device 100 may include a driving circuit (e.g., a motor and/or a rolling gear) for sliding the flexible display 120 with respect to the housing 110. The above-described sensor structure or driving circuit is merely an example and a range of embodiments is not limited to a specific type of sensor structure or driving circuit.

Figure 2A:
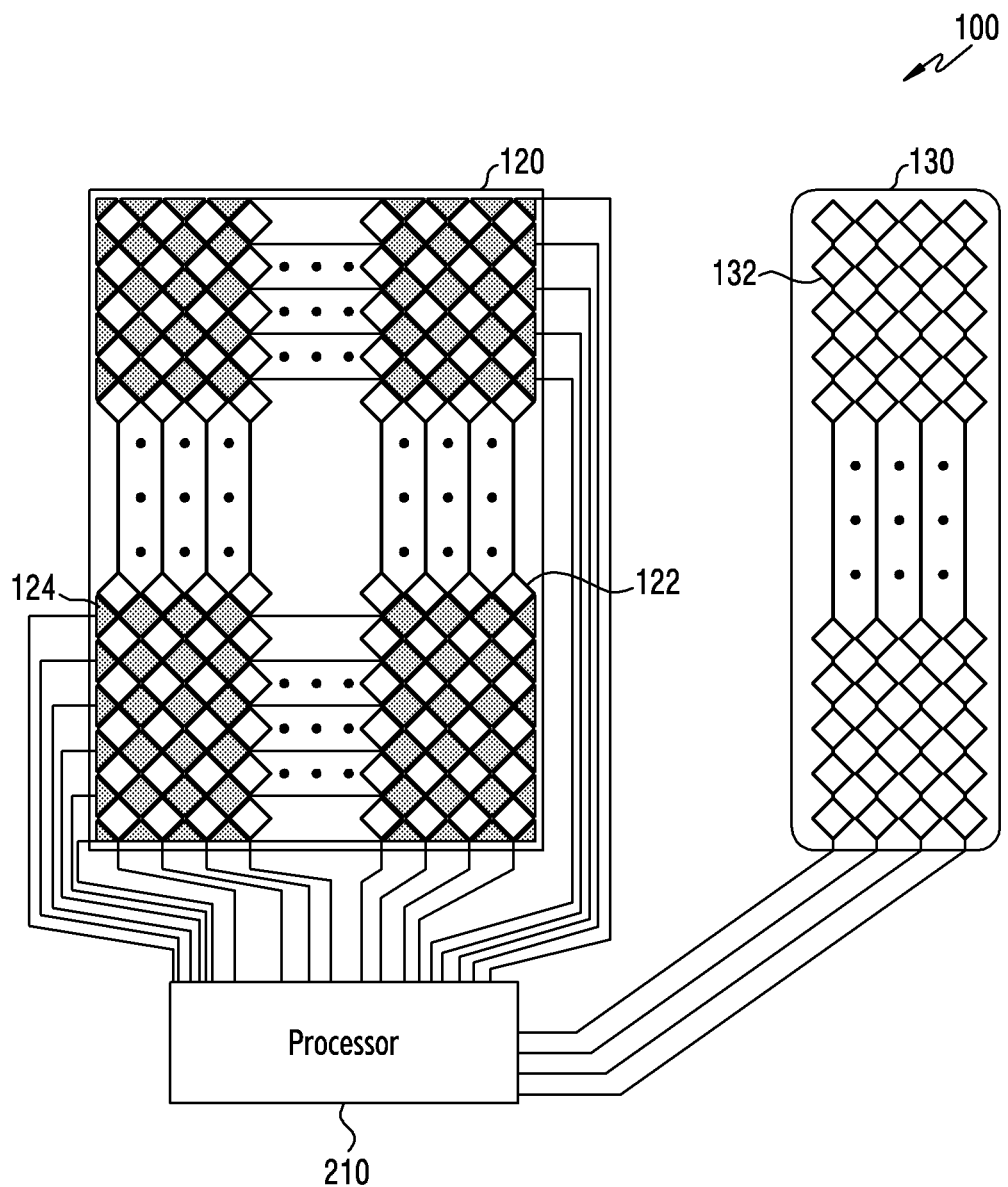
FIG. 2A is a view illustrating a touch structure of an electronic device according to an embodiment of the disclosure.
Figure 2B:
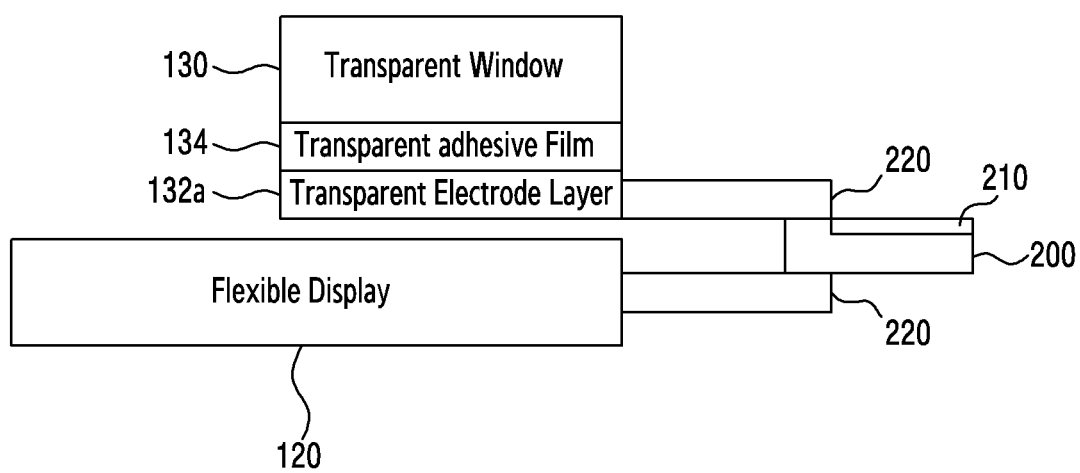
FIG. 2B is a view illustrating a sectional structure of an electronic device according to an embodiment of the disclosure.
Figure 2C:
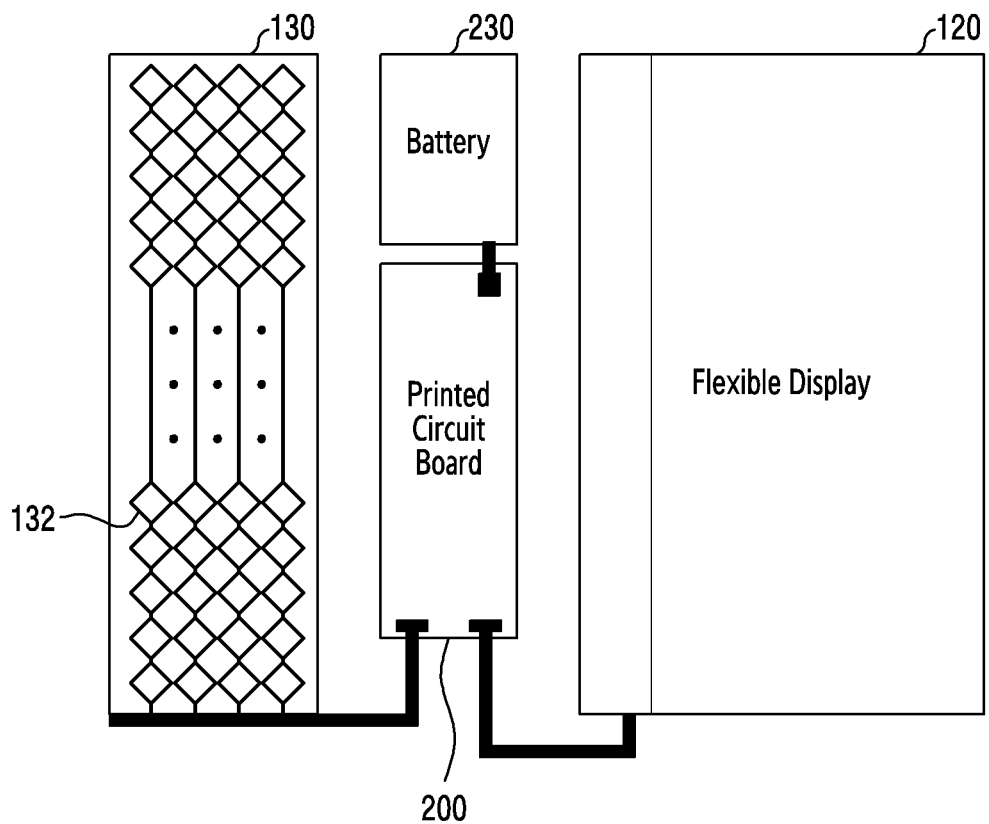
FIG. 2C is a view illustrating an assembly structure of an electronic device according to an embodiment of the disclosure.

FIG. 2A is a view illustrating a touch structure of an electronic device according to an embodiment of the disclosure. FIG. 2B is a view illustrating a sectional structure of an electronic device according to an embodiment of the disclosure. FIG. 2C is a view illustrating an assembly structure of an electronic device according to an embodiment of the disclosure.

Referring to FIG. 2A, the electronic device 100 according to an embodiment may include the flexible display 120 and the transparent window 130. Reference numeral 132 is a first touch electrode arranged on the transparent window 130 and exemplifies a reception electrode. Reference numeral 122 is second touch electrodes arranged on the flexible display 120 and exemplifies reception electrodes. Reference numeral 124 is third touch electrodes arranged on the flexible display 120 and exemplifies transmission electrodes.

Each of the at least one first touch electrode 132 on the transparent window 130, and the second touch electrodes 122 and the third touch electrodes 124 of the flexible display 120 may be patterned with a transparent conductive material such as indium tin oxide (ITO).

At least one first touch electrode 132 (reception electrode) may be arranged on the transparent window 130. By way of example, the at least one first touch electrode 132 (reception electrode) arranged on the transparent window 130 may be arranged in parallel with the second touch electrodes 122 (reception electrodes) of the flexible display 120.

The second touch electrodes 122 (reception electrodes) and the third touch electrodes 124 (transmission electrodes) may be arranged on the touch area of the flexible display 120. The second touch electrodes 122 may correspond to multiple reception electrode lines. The third touch electrodes 124 may correspond to multiple transmission electrode lines. By way of example, the second touch electrodes 122 and the third touch electrodes 124 may be formed in a direction (e.g., a column direction and a row direction) to intersect with each other on front and rear surfaces of a substrate. For another example, the second touch electrodes 122 and the third touch electrodes 124 may be alternately formed with each other on the same plane.

Referring to FIG. 2B, the transparent electrode layer 132a may be disposed between the flexible display 120 and the transparent window 130. By way of example, the transparent electrode layer 132a may be stacked on one surface (e.g., an internal surface) of the transparent window 130 facing a partial area (projection area) of the flexible display 120. At least one first touch electrode 132 (reception electrode) may be included in the transparent electrode layer 132a. For example, the transparent electrode layer 132a may be formed of a transparent electrode film having a predetermined pattern and attached to one surface of the transparent window 130 by using a transparent adhesive film 134.

The electronic device 100 may include at least one processor 210. The flexible display 120, the transparent electrode layer 132a, and the processor 210 included in the electronic device 100 may be electrically and/or operatively connected to each other to exchange a signal (e.g., a command or data) with each other. The electronic device 100 may include at least a portion of an electronic device 1201 shown in FIG. 12 described below. For example, the flexible display 120 may include a display module 1260 in FIG. 12. The processor 210 may include at least a portion of processor 1220 shown in FIG. 12.

The processor 210 may include a touch detection circuit. The processor 210 may be electrically and/or operatively connected to the second touch electrodes 122, the third touch electrodes 124, and the transparent electrode layer 132a.

As shown in the drawing, the second touch electrodes 122 of the flexible display 120 may be reception electrode lines arranged in a column direction. The third touch electrodes 124 may be transmission electrode lines arranged in a row direction. By way of example, the second touch electrodes 122 and the third touch electrodes 124 may be alternately formed with each other to have a matrix pattern on the front and rear surfaces of a substrate. Each intersection point (overlap point) of the second touch electrodes 122 (reception electrodes) and the third touch electrodes 124 (transmission electrodes) may operate as touch cells (or touch sensors). For another example, the reception electrodes and the transmission electrodes may be alternately formed on the same plane. Each point including a pair of transmission electrode and reception electrode may operate as a touch cell (or touch sensor).

In an embodiment, the processor 210 may detect a touch through the touch cell. By way of example, the processor 210 may detect a touch through a change in mutual capacitance between two touch electrodes (transmission electrode and reception electrode) configuring the touch cell. For touch recognition, the processor 210 may apply a driving signal to the transmission electrode and acquire a sensing value from the reception electrode mutually coupled to the transmission electrode. In case that a touch occurs, a sensing value acquired from the reception electrode is changed and whether a touch occurs and/or a touch location (coordinates) may be recognized by using the sensing value.

The processor 210 may be electrically connected to the flexible display 120 and the transparent electrode layer 132a. The processor 210 may identify (or determine) the projection area of the flexible display 120 or at least one touch electrode (e.g., a first part of the second touch electrodes 122) arranged on the projection area. Based on the identification result, the processor 210 may allocate (configure) identification information with respect to the at least one first touch electrode 132 on the transparent window 130 and touch electrodes (e.g., the second touch electrodes 122) of the flexible display 120. As a location of the projection area is changed by the sliding operation, the processor 210 may change identification information with respect to the at least one first touch electrode 132 on the transparent window 130 and touch electrodes (e.g., the second touch electrodes 122) of the flexible display 120. The identification information may correspond to an address allocated (configured) to each touch electrode. For example, in the basic state before the sliding operation, addresses may be consecutively allocated to the second touch electrodes 122 and the at least one first touch electrode 132. As the second touch electrodes 122 and the at least one first touch electrode 132 are rearranged by the sliding operation, the addresses allocated to the second touch electrodes 122 and the at least one first touch electrode 132 may be changed.

The processor 210 may detect a moving distance of the flexible display 120 according to the sliding operation by using at least one sensor (e.g., a distance sensor, a Hall sensor, a magnet sensor, a gyro sensor, an acceleration sensor, a grip sensor, a proximity sensor, a gesture sensor, and an infrared sensor). Based on the detected moving distance, the processor 210 may identify (or determine) the projection area of the flexible display 120 or at least one touch electrode (e.g., a portion of the second touch electrodes 122) arranged on the projection area.

In a state in which the transparent window 130 is disposed to project a partial area (projection area) of the flexible display 120 (e.g., the basic state or the complete contraction state), the processor 210 may activate at least one first touch electrode 132 arranged on the transparent window 130. The processor 210 may deactivate at least one second touch electrode 122 arranged on the projection area of the flexible display 120 and not used. The processor 210 may match the activated at least one first touch electrode 132 to the deactivated at least one second touch electrode 122. The activated at least one first touch electrode 132 may be used in place of the at least one second touch electrode 122 to which the activated at least one first touch electrode is matched.

In case that at least one first touch electrode 132 (e.g., a reception electrode) arranged on the transparent window 130 overlaps at least one second touch electrode 122 (e.g., a reception electrode) within the projection area of the flexible display 120, the processor 210 may match the overlapping touch electrodes and detect a touch by using the matched touch electrodes.

In case that the projection area of the flexible display 120 is changed by the sliding operation, the processor 210 may detect a moving distance of the flexible display 120 through at least one sensor. Based on the moving distance, the processor 210 may identify a changed projection area or at least one touch electrode (e.g., a second part of the second touch electrodes 122) arranged on the projection area again.

The processor 210 may deactivate at least one touch electrode (e.g., the second part of the second touch electrodes 122) arranged on a changed projection area and activate at least one touch electrode (e.g., the other part excluding the second part of the second touch electrodes 122) deviating the changed projection area. At least one first touch electrode 132 may be maintained in an activated state. The processor 210 may match the activated at least one first touch electrode 132 to deactivated at least one touch electrode (e.g., the second part of the second touch electrode 122) positioned at the changed projection area.

FIG. 2B is an example illustrating a schematic staking structure of the transparent window 130, the transparent electrode layer 132a, and the flexible display 120 of the electronic device 100. The transparent electrode layer 132a may be electrically connected to the flexible display 120 through a flexible printed circuit board (FPCB) 220.

A touch area (or touch detection layer) may be configured on the front side of the flexible display 120. The transparent electrode layer 132a may be arranged on the transparent window 130. At least one first touch electrode 132 (e.g., a reception electrode) may be included in the transparent electrode layer 132a. By way of example, the first touch electrode 132 of the transparent electrode layer 132a may be patterned to an internal side of the transparent window 130 by using a transparent conductive material such as ITO. The transparent electrode layer 132a may be stacked on the transparent window 130 by using the transparent adhesive film 134 (e.g., an optically clear adhesive (OCA) film).

The processor 210 may drive at least one first touch electrode 132 according to a location of a projection area of a touch area of the flexible display 120 overlapping the transparent window 130 to prevent touch performance degradation with respect to the projection area (overlapping area).

The processor 210 may be positioned on a printed circuit board 200. Referring to FIGS. 2B and 2C, the printed circuit board 200 including the processor 210 may be connected to a battery 230. The printed circuit board 200 may be electrically and/or operatively connected to the flexible display 120 and the transparent electrode layer 132a through the flexible printed circuit board 220. A wire structure including the printed circuit board 200, the battery 230, and the printed circuit board 200 may be assembled inside the housing 110. Although it is exemplified the structure in which the flexible display 120 and the transparent electrode layer 132a of the transparent window 130 are connected through the printed circuit board 200 in FIGS. 2B and 2C, a structure in which the flexible display 120 is directly connected to the transparent electrode layer 132a may be possible according to an internal structure.

Figure 3:
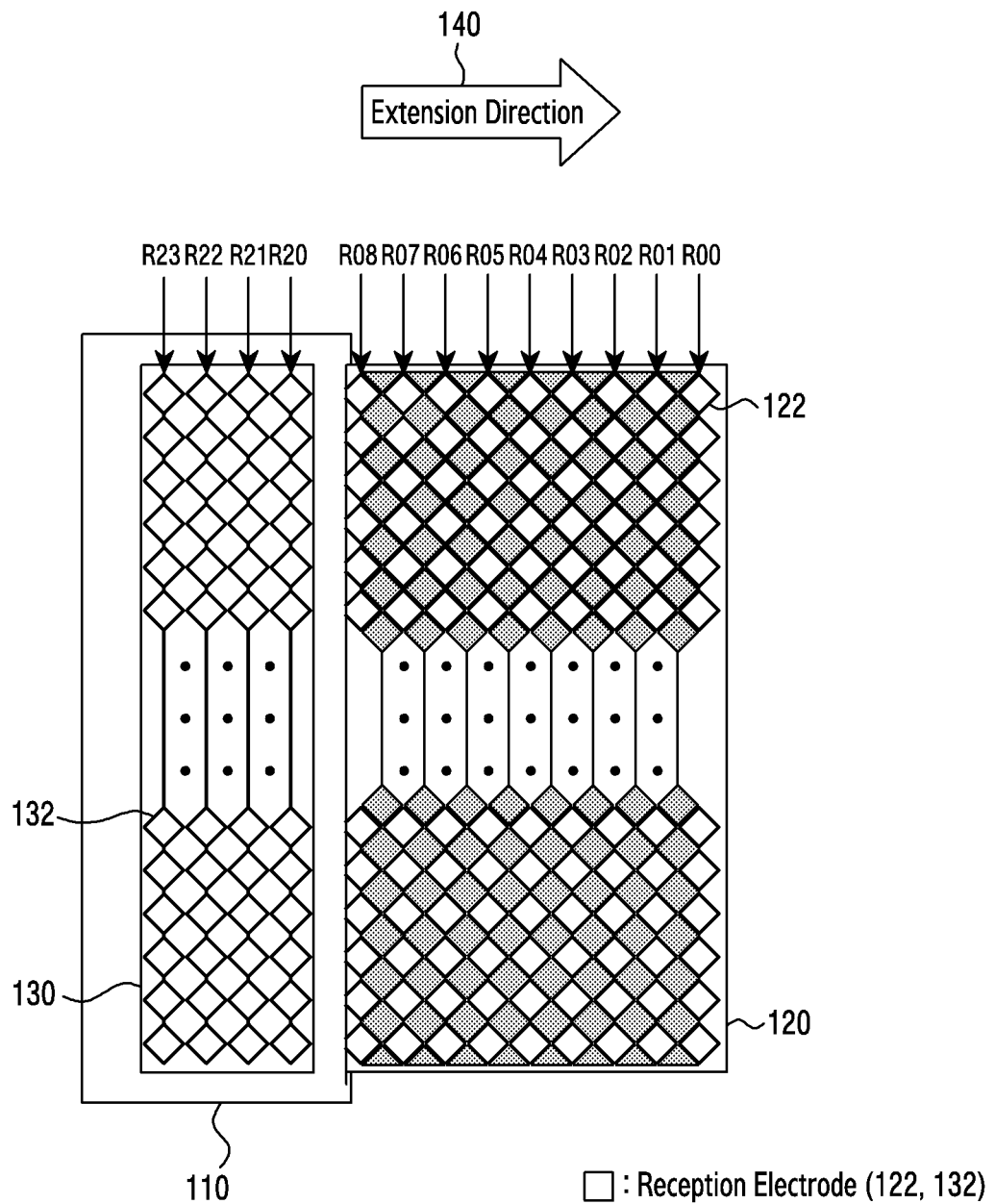
FIG. 3 is a view illustrating a use state of an electronic device according to an embodiment of the disclosure.

FIG. 3 is a view illustrating a use state of an electronic device according to an embodiment of the disclosure.

In a state in which at least a portion of the flexible display 120 is drawn into the housing 110 (e.g., the basis state (complete contraction state), or the intermediate state (extending state or contracting state)), the whole touch area of the flexible display 120 may be entirely used through the transparent window 130.

As shown in the drawing, a portion of the flexible display 120 may be drawn into the housing 110. The portion of the flexible display 120 drawn into the housing 110 may be projected through the transparent window 130.

By way of example, in the basic state (complete contraction state) of the electronic device 100, assuming that an alpha area drawn into the housing 110 is a first area and a main area exposed to the outside of the housing 110 is a second area, the first area may be in a state of substantially (e.g., 90% or more) overlapping the transparent window 130. The first area may be a projection area (or overlapping area).

FIG. 3 exemplifies the intermediate state (extending state) of the electronic device 100, in which the flexible display 120 is drawn out in the first direction 140 to be extended. A portion of the flexible display 120 may be drawn into the housing 110 and the remaining portion may be drawn out (exposed) to the outside.

For example, the first area (projection area) of the entire area of the flexible display 120, which is drawn into the housing 110 may display a screen consecutive to a second area of the outside of the housing 110 or may be activated as a separate area to display a video, a social media notice material, and/or information of a notification message thereon. In this case, a gap between the transparent window 130 and the flexible display 120 may cause difficulty in touch recognition.

In an embodiment, by adding the transparent electrode layer 132a including at least one first touch electrode 132 to the transparent window 130, and appropriately driving the first touch electrode 132 according to a location of the transparent window 130 or a projection area overlapping at least one first touch electrode 132 on the transparent window 130, touch performance degradation with respect to the projection area may be prevented.

Referring to FIG. 3, at least one first touch electrode 132 (e.g., four reception electrode lines R20-R23) may be arranged on the transparent window 130 in a column direction. The second touch electrodes 122 (e.g., reception electrode lines R00-R08) may be arranged on the flexible display 120 in the column direction. The first touch electrode 132 of the transparent window 130 may be arranged in parallel with the second touch electrodes 122 of the flexible display 120.

Referring to FIG. 3, in case that the flexible display 120 is extended, the second touch electrodes 122 of the flexible display 120 may user reception addresses of reception electrode lines R00-R08. First touch electrodes 132 (reception electrode lines R20-R23) of the transparent window 130 may be activated and second touch electrodes 122 (reception electrode lines R09-R12) within a projection area overlapping the transparent window 130 or at least one first touch electrode 132 may be deactivated.

First touch electrodes 132 (four reception electrode lines R20-R23) of the transparent window 130 may be matched to some (reception electrode lines R09-R12) of the second touch electrodes 122 of the flexible display 120, which are arranged on a projection area (overlapping area). The addresses of reception electrode lines R09-R12 arranged on the projection area may be allocated to the first touch electrodes 132 of the transparent window 130.

The projection area of the flexible display 120 may be changed according to a moving distance (extension distance) or a mechanical state (extension/contraction state) of the flexible display 120 according to the sliding operation.

According to a moving distance (extension distance) or a mechanical state (extension/contraction state) of the flexible display 120, the electronic device 100 may identify the projection area (or overlapping area) of the flexible display 120 or a touch electrode (or touch electrodes) arranged on the projection area and match the touch electrode (or touch electrodes) arranged on the transparent window 130 to the identified touch electrode (or touch electrodes) to be used for touch recognition.

In various embodiments, a touch electrode (e.g., the first touch electrode 132, the second touch electrode 122, or the third touch electrode 124) may be referred to as a touch channel. The touch electrode may correspond to one of a transmission electrode (transmission channel) or a reception electrode (reception channel). Matching between a touch electrode (e.g., the first touch electrode 132) arranged on the transparent window 130 and a touch electrode (e.g., the second touch electrode 122) arranged on the flexible display 120 may be referred to as "electrode matching (or electrode mapping)."

For example, assuming that the touch electrode (e.g., a reception electrode) arranged on the transparent window 130 is a first touch electrode and the touch electrode (e.g., a reception electrode) arranged on the flexible display 120 is a second touch electrode, the electrode matching may include an operation of identifying (determining) a second touch electrode matched to the first touch electrode among second touch electrodes, or a projection area or the flexible display 120 or a second touch electrode arranged on the projection area. For another example, the electrode matching may include an operation of consecutively allocating (configuring) addresses only to activated touch electrodes among first touch electrodes and second touch electrodes. For still another example, the electrode matching may include an operation of allocating (configuring) an address of a second touch electrode within the projection area as an address for a first touch electrode. For still another example, the electrode matching may include an operation of changing an address pre-allocated to a first touch electrode with an address allocated to a second touch electrode within the projection area.

Figure 4:
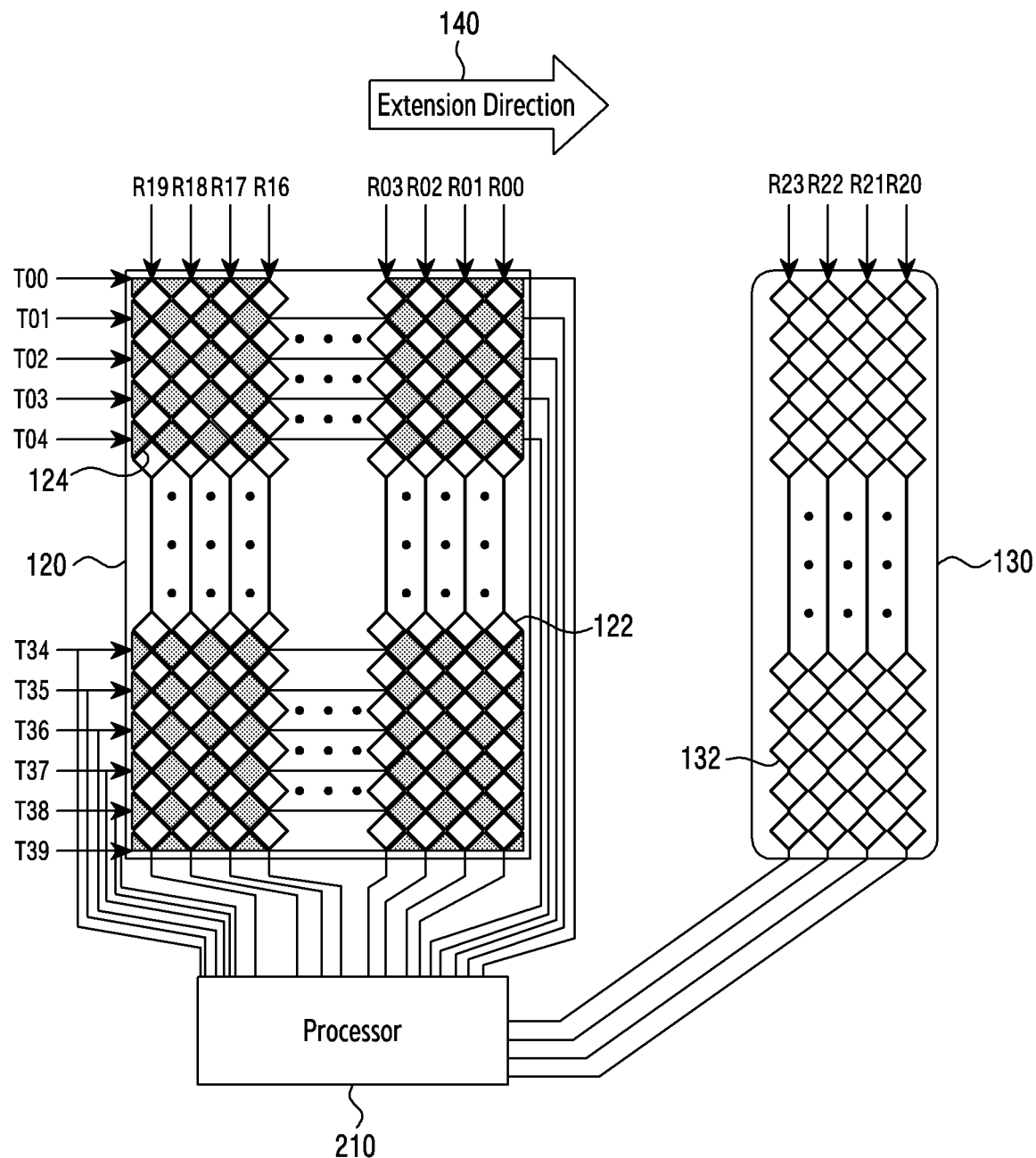
FIG. 4 is a view illustrating an addressing scheme of an electronic device according to an embodiment of the disclosure.

FIG. 4 is a view illustrating an addressing scheme of an electronic device according to an embodiment of the disclosure.

Referring to FIG. 4, the electronic device 100 may detect a moving distance (e.g., an extension/contraction distance) or a mechanical state (e.g., an extension/contraction state) of the flexible display 120 by using a sensor structure. For example, the sensor structure may include one or more of a distance sensor, an optical sensor, a Hall sensor, a magnet sensor, a gyro sensor, an acceleration sensor, a grip sensor, a proximity sensor, a gesture sensor, and/or an infrared sensor.

The electronic device 100 may sense a moving distance or a mechanical state of the flexible display 120 through a sensor structure. Based on the sensed value, the electronic device 100 may identify the projection area of the flexible display 120 or at least one touch electrode (e.g., a portion of the second touch electrodes 122) arranged on the projection area. The electronic device 100 may match at least one touch electrode (e.g., the first touch electrode 132) arranged on the transparent window 130 to the identified at least one touch electrode. Through the matching, at least one touch electrode (e.g., the first touch electrode 132) on the transparent window 130 may be used as an electrode replacing at least one touch electrode (e.g., a portion of the second touch electrodes 122) within the projection area of the flexible display 120. At least one touch electrode (e.g., the first touch electrode 132) on the transparent window 130 may be activated to be used. At least one touch electrode (e.g., a portion of the second touch electrodes 122) within the projection area of the flexible display 120 may be deactivated and not used.

The electronic device 100 may recognize a touch by using activated touch electrodes among touch electrode of the flexible display 120 and a touch electrode (or touch electrodes) of the transparent window 130 mapped to a deactivated touch electrode (or touch electrodes) among the touch electrodes. According to an embodiment, matching between a touch electrode on the transparent window 130 and a touch electrode of the flexible display 120 may be understood as mapping between a touch electrode on the transparent window 130 and a touch electrode of the flexible display 120.

FIG. 4 exemplifies an electrode addressing scheme for electrode matching between a flexible display and a transparent window. Referring to FIG. 4, reference numeral 132 indicates a first touch electrode (reception electrode) arranged on the transparent window 130. Reference numeral 122 indicates second touch electrodes (reception electrodes) arranged on the flexible display 120. For example, the second touch electrodes 122 may be reception electrode lines of the flexible display 120 arranged in a column direction. Reference numeral 124 indicates third touch electrodes (transmission electrodes) arranged on the flexible display 120. For example, the third touch electrodes 124 may be transmission electrode lines of the flexible display 120 arranged in a row direction.

The first touch electrode 132 on the transparent window 130 may be arranged in parallel with one of the second touch electrodes 122 and the third touch electrodes 124. FIG. 4 exemplifies that the first touch electrode 132 as a reception electrode on the transparent window 130 is arranged in parallel with the second touch electrodes 122 (reception electrodes) of the flexible display 120.

In the basic state (complete contraction state) of the electronic device 100, the second touch electrodes 122 (reception electrodes) within the flexible display 120 may be allocated with addresses of reception electrode lines R00-R19. The third touch electrodes 124 (transmission electrodes) within the flexible display 120 may be allocated with addresses of transmission electrode lines T00-T39. Addresses of reception electrode lines R20-R23 may be allocated to the first touch electrodes (reception electrodes) 132 of the transparent window 130.

Depending on a change in size of the flexible display 120, the processor 210 may perform matching (electrode matching or electrode mapping) between touch electrodes arranged on the transparent window 130 and the flexible display 120 to control touch detection.

For example, in the basic state (complete contraction state) in which the flexible display 120 is completed contracted, a portion (e.g., reception electrode with reception addresses of reception electrode lines R00-R03) of the second touch electrodes 122 may be positioned on an area (projection area) overlapping the transparent window 130 or at least one first touch electrode 132 on the transparent window 130. In case that reception electrodes of reception electrode lines R00-R03 within the flexible display 120 are positioned on the projection area, the processor 210 may activate reception electrodes of reception electrode lines R20-R23 arranged on the transparent window 130 instead of the reception electrode of reception electrode lines R00-R03 and use the same. The processor 210 may sense a capacitance change between the reception electrodes of reception electrode lines R20-R23 on the transparent window 130 and the transmission electrodes of transmission electrode lines T00-T39 within the flexible display 120 so as to recognize a touch with respect to the projection area.

In case that the flexible display 120 is extended along the first direction 140 (extension direction), a position of the projection area may be changed according to a moving distance (extension distance) of the flexible display 120. As the position of the projection area is changed, among the second touch electrodes 122 (reception electrodes of reception electrode lines R00-R19) within the flexible display 120, a portion overlapping the first touch electrodes 132 (reception electrodes of reception electrode lines R20-R23) on the transparent window 130 may be changed.

In case that the flexible display 120 is extended, the processor 210 may identify (or determine) reception electrodes arranged on the projection area among the reception electrodes of reception electrode lines R00-R19 arranged on the flexible display 120 based on a moving distance (extension distance) of the flexible display 120 and match reception electrodes of reception electrode lines R20-R23 arranged on the transparent window 130 to the identified reception electrodes. As such, the matching between reception electrodes may allow controlling for touch detection. In the same manner, in case that the flexible display 120 is contracted, the processor 210 may perform matching between touch electrodes arranged on the transparent window 130 and the flexible display 120 based on a moving distance (contraction distance) of the flexible display 120 and control touch detection by using the matched touch electrodes.

FIGS. 5A, 5B, 5C, 5D, and 5E are views illustrating an electrode matching scheme according to an extension of an electronic device and simply schematize electrode matching depending on a change of an overlapping position between a flexible display and a transparent window according to various embodiments of the disclosure.

A position of the projection area overlapping the transparent window 130 or at least one first touch electrode 132 on the transparent window 130 may be changed according to a mechanical state (extension/contraction state) of the flexible display 120. The first touch electrode 132 on the transparent window 130 may be used as a reception electrode or a transmission electrode for touch detection in a state of overlapping a partial area (projection area) of the flexible display 120. For touch detection, the processor 210 may allocate (configure) or change addresses for the second touch electrodes 122 (e.g., reception electrodes) and the third touch electrodes 124 (e.g., transmission electrodes) of the flexible display 120, and the first touch electrode 132 (e.g., a reception electrode) on the transparent window 130.

Referring to FIGS. 5A, 5B, 5C, 5D, and 5E, the flexible display 120 is extended in the first direction 140 and an extension degree of the flexible display 120 is depicted in five stages (a complete contraction state 510 in stage 1→ extending states 520, 530, and 540 in stages 2, 3, and 4, respectively, → and a complete extension state 550 in stage 5).

As described with reference to FIGS. 1A and 1B, in a state in which the flexible display 120 is slid in the housing 110 to be completely wound around the rotation body 150 (complete contraction state), as the flexible display is slid out to the outside of the housing 110 to be extended, a position of the projection area overlapping the transparent window 130 or at least one first touch electrode 132 on the transparent window 130 may be changed.

Referring to FIGS. 5A to 5E, as the flexible display 120 is gradually extended in the first direction 140 (extension direction) (in the order of complete contraction state 510→extending state 520→extending state 530→extending state 540→complete extension state 550), a projection area of a touch area within the flexible display 120, which overlaps the transparent window 130 or at least one first touch electrode 132 on the transparent window 130 may be shifted in a second direction opposite to the first direction 140. Parts of reception electrode lines R00-R19 arranged on the touch area of the flexible display 120, which is matched to reception electrode lines R20-R23 arranged on the transparent window 130 may be consecutively shifted.

In FIGS. 5A to 5E, the number of reception electrode lines R00-R19 within the flexible display 120 is exemplified by 20 and the number of transmission electrode lines T00-T39 is exemplified as 40. The number of reception electrode lines R20-R23 on the transparent window 130 is exemplified as 4. Such state change of the flexible display 120, that is, the electrode structure or the touch structure is merely an example and the range of embodiments is not limited thereto. Extension/contraction stages may be variably divided. By way of example, extension/contraction operations may be subdivided according to an extension/contraction free stop structure.

Figure 5A:
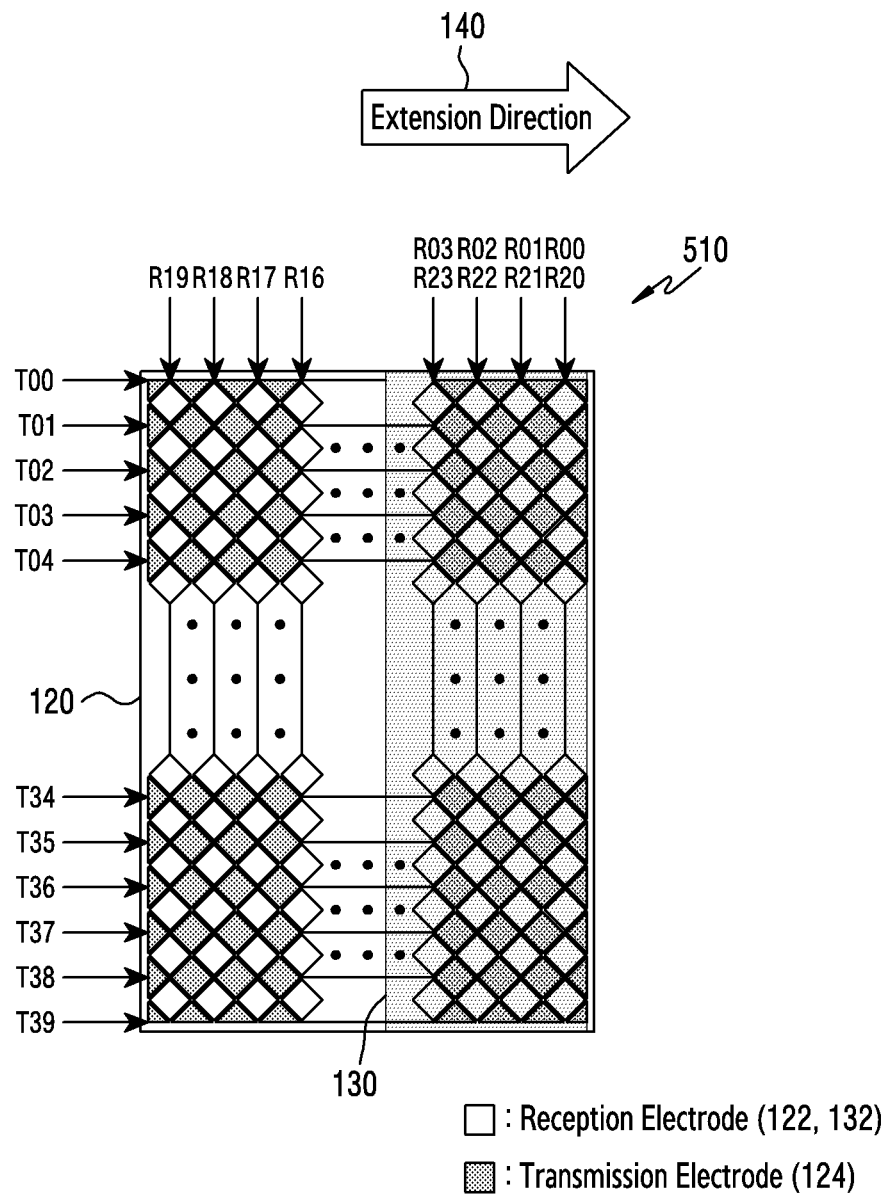
FIGS. 5A, 5B, 5C, 5D, and 5E are views illustrating an electrode matching scheme according to an extension of an electronic device according to various embodiments of the disclosure.

Referring to FIG. 5A, reception addresses of reception electrode lines R00-R19 may be consecutively allocated to reception electrodes in the flexible display 120. Reception electrode lines R20-R23, which are reception addresses consecutive to reception electrode lines R00-R19, may be allocated to reception electrodes of the transparent window 130. According to a location of a projection area, the reception electrode lines R20-R23 of the transparent window 130 may be used in place of a part of the reception electrode lines R00-R19 of the flexible display 120. Transmission addresses of transmission electrode lines T00-T39 may be consecutively allocated to transmission electrodes of the flexible display 120.

In the complete contraction state 510 of the flexible display 120, all reception electrode lines R20-R23 of the transparent window 130 may overlap the projection area of the flexible display 120. The reception electrode lines R20-R23 of the transparent window 130 may overlap the reception electrode lines R00-R03 of the flexible display 120. Based on that the reception electrode lines R20-R23 of the transparent window 130 overlap the second touch electrodes 122 (e.g., reception electrode lines R00-R03) of the flexible display 120, the reception electrode lines R20-R23 of the transparent window 130 may be matched to the reception electrode lines R00-R03 of the flexible display 120.

The first touch electrodes 132 of the transparent window 130 may be consecutively matched to some of the second touch electrodes 122 of the flexible display 120 according to a location change of the projection area and consecutively activated according to the matching to be used. Among the second touch electrodes 122 in the flexible display 120, some electrodes overlapping the first touch electrodes 132 on the transparent window 130 to be replaced by the first touch electrodes 132 may be deactivated and not used.

The electrode matching between the flexible display 120 and the transparent window 130 may be controlled based on displacement of the projection area according to extension/contraction of the flexible display 120. For the electrode matching appropriate for a mechanical state (extension/contraction state) of the flexible display 120, a moving distance by the sliding operation of the flexible display 120 may be detected. Based on the moving distance of the flexible display 120, the electronic device 100 may identify the projection area of the flexible display 120 or at least one touch electrode arranged on the projection area.

The electronic device 100 may detect a touch (e.g., whether there is a touch, and/or a touch position) by using the electrode matching.

For example, in the complete contraction state 510, based on that a reception electrode line R01 among the second touch electrodes 122 of the flexible display 120 overlaps a reception electrode line R21 corresponding to the first touch electrodes 132 arranged on the transparent window 130, the reception electrode line R21 may be matched to the reception electrode line R01. The reception electrode line R01 of the flexible display 120 may be deactivated. The reception electrode line R21 of the transparent window 130 may be activated to be used as an electrode replacing the reception electrode line R01. For touch detection, the electronic device 100 may apply a driving signal to the third touch electrodes 124 (transmission electrode lines T00-R30). The electronic device 100 may acquire a sensing value through the activated second touch electrodes 122 (e.g., the reception electrode lines R00 and R02-R19) and the first touch electrode 132 (e.g., the reception electrode line R21) on the transparent window 130. In case a touch occurs at an intersection point (overlapping point) of the transmission electrode line T01 and the reception electrode line R21 (replacing the reception electrode line R01), the electronic device 100 may acquire a sensing value from the reception electrode line R21 and recognize the touch (e.g., whether there is a touch or a touch position (coordinates)) by the sensing value. In case that the reception electrode line R21 is matched to the reception electrode line R01, an intersection point of the transmission electrode line T01 and the reception electrode line R21 may be recognized as a touch point corresponding to an intersection point of the transmission electrode line T01 and the reception electrode line R01.

Referring to FIG. 5A, in case that extension of the flexible display 120 is in progress and enter the extending state 520, 530, and 540 in the complete contraction state (or complete drawn-in state) 510 of stage 1, as the flexible display 120 is extended in the first direction 140, a position of the projection area may be moved in the first direction 140. The transparent window 130 may be moved in a second direction opposite to the first direction 140. According to movement of the transparent window 130, the reception electrodes of reception electrode lines R20-R23 of the transparent window 130 may be activated in order of R20, R21, R22, and R23 along the second direction.

Figure 5B:
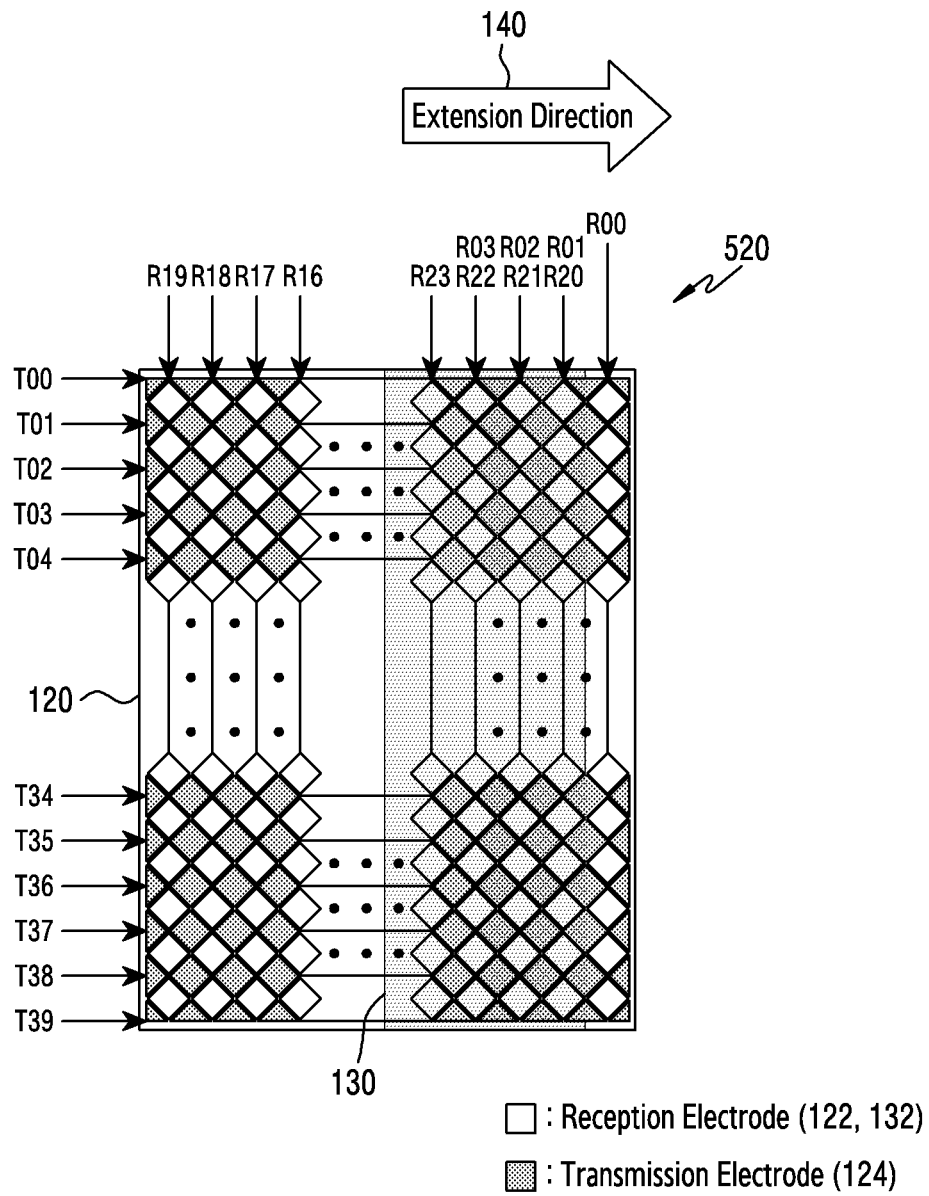

Referring to FIG. 5B, in the extending state 520 of stage 2, based on that the reception electrodes of reception electrode lines R20-R23 of the transparent window 130 overlap the reception electrodes of reception electrode lines R01-R03 of the flexible display 120, the reception electrodes of reception electrode lines R20-R22 may be matched to the reception electrodes of reception electrode lines R01-R03. The addresses of reception electrode lines R20-R22 of the reception electrodes arranged on the transparent window 130 may be changed to reception electrode lines R01-R03.

Figure 5C:
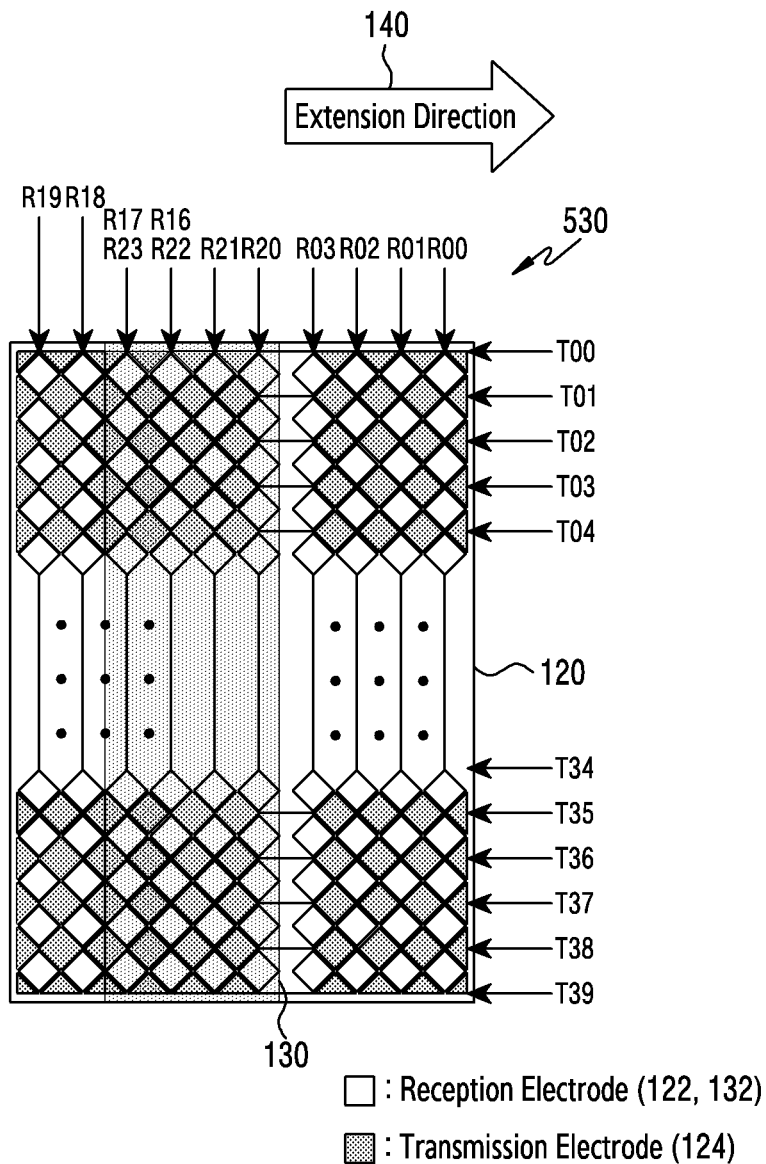

Referring to FIG. 5C, in the extending state 530 of stage 3, based on that the reception electrodes of reception electrode lines R20-R23 of the transparent window 130 overlap the reception electrodes of reception electrode lines R14-R17 of the flexible display 120, the reception electrodes of reception electrode lines R20-R23 may be matched to the reception electrodes of reception electrode lines R14-R17. The reception electrodes of reception electrode lines R14-R17, which are a part of reception electrode lines R00-R19 arranged on the flexible display 120, may be deactivated. The reception electrodes of reception electrode lines R20-R23 arranged on the transparent window 130 may be activated. The addresses of reception electrode lines R20-R23 of the reception electrodes may be changed to reception electrode lines R14-R17.

Figure 5D:
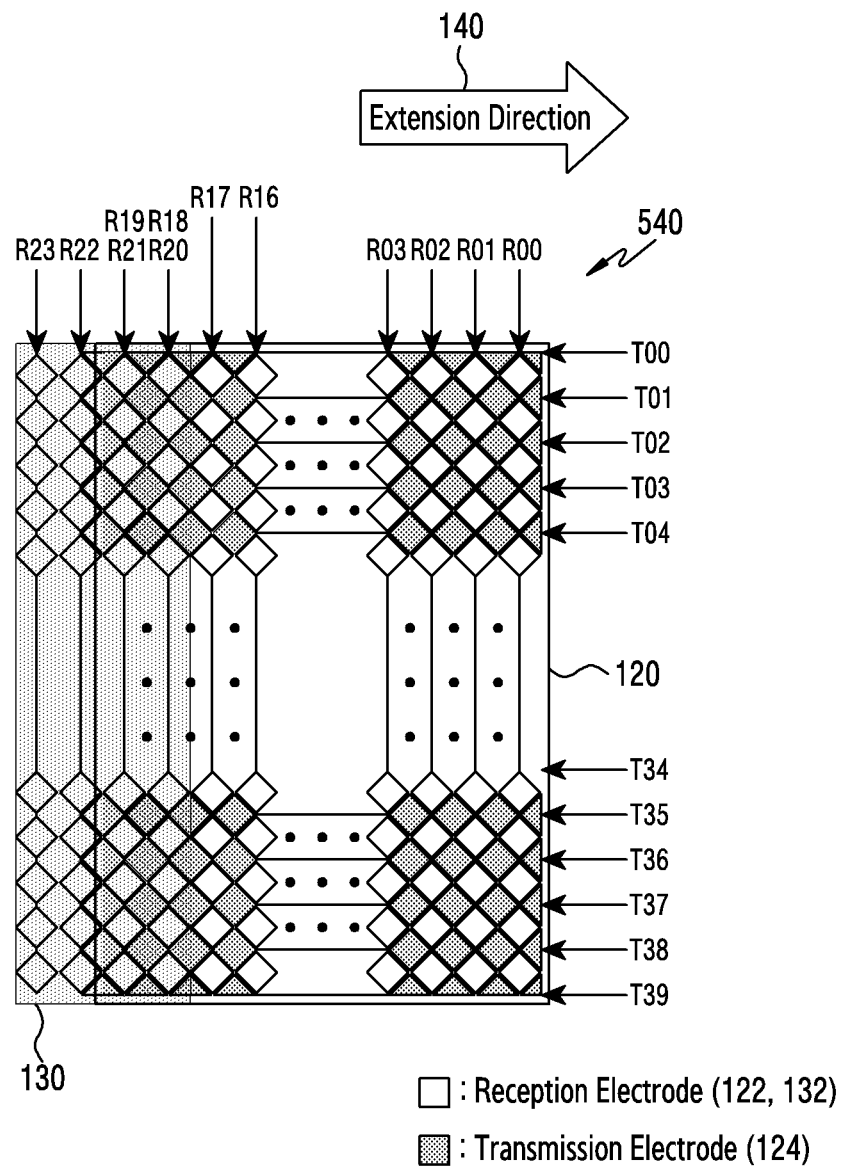

Referring to FIG. 5D, in the extending state 540 of stage 4, based on that the reception electrodes of reception electrode lines R20 and R21 of the transparent window 130 overlap the reception electrodes of reception electrode lines R18 and R19 of the flexible display 120, the electronic device 100 may match the reception electrodes of reception electrode lines R20 and R21 arranged on the transparent window 130 to the reception electrodes of reception electrode lines R18 and R19, respectively. The reception electrodes of reception electrode lines R18 and R19 may be deactivated and the reception electrodes of reception electrode lines R20 and R21 are activated to be used for touch recognition. The addresses of reception electrode lines R20 and R21 of the reception electrodes may be changed to reception electrode lines R18 and R19, respectively. As extension progresses and the electrodes of reception electrode lines R22 and R23 move out from the touch area of the flexible display 120, the electrodes of reception electrode lines R22 and R23 may be deactivated and not used.

Figure 5E:
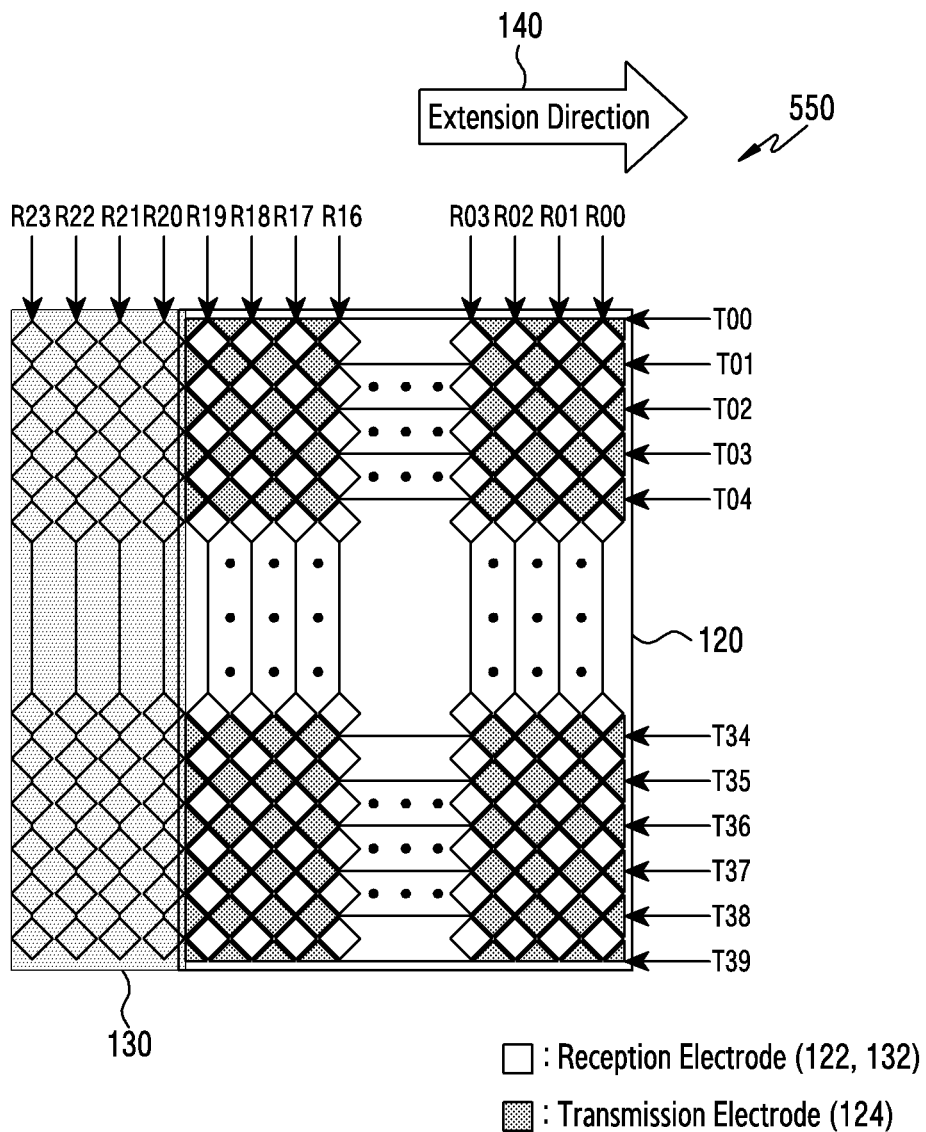

Referring to FIG. 5E, in case of the complete extension state 550 (or the complete drawn-out state) of stage 5, the reception electrodes of reception electrode lines R20-R23 arranged on the transparent window 130 may be activated in order of R23, R22, R21, and R20 according to the order of deviating the touch area. The complete extension state 550 may correspond to a state in which the flexible display 120 is drawn out up to a designated maximum distance by the sliding operation (sliding-out operation).

In the complete extension state 550, overlapping between the touch area of the flexible display 120 and the transparent window 130 may not occur. Accordingly, the addresses consecutively allocated to the reception electrode lines R00-R19 of the flexible display 120 may be maintained unchanged.

In the electronic device 100 according to an embodiment, at least one first touch electrode 132 (e.g., a reception electrode) formed on the transparent window 130 may be arranged to correspond to a part of the second touch electrodes 122 (e.g., reception electrodes) of the flexible display 120. According to an arranged location, addresses may be consecutively allocated to the second touch electrodes 122 and at least one first touch electrode 132. By way of example, at least one first touch electrode 132 arranged on the transparent window 130 may be mapped (or matched) to at least one of the second touch electrodes 122 of the flexible display 120.

As the flexible display 120 is extended in the first direction 140 by the sliding operation of the flexible display 120, the location of the projection area may move in the first direction 140. A location of at least one first touch electrode 132 on the transparent window 130 may be moved in the second direction opposite to the first direction 140 to be rearranged. According to a rearranged location, addresses may be consecutively re-allocated to the second touch electrodes 122 and at least one first touch electrode 132.

In the complete extension state (e.g., complete extension state 550) of the flexible display 120, a location of at least one first touch electrode 132 on the transparent window 130 may deviate from the touch area of the flexible display 120. For example, at least one first touch electrode 132 of the transparent window 130 may be deactivated and addresses for entire second touch electrodes 122 may be consecutively allocated.

As the flexible display 120 is contracted in the second direction opposite to the first direction 140 by the sliding operation, a location of the projection area may be moved in the second direction. A location of at least one first touch electrode 132 on the transparent window 130 may be moved in the second direction to be rearranged. According to a rearranged location, addresses may be consecutively re-allocated to the second touch electrodes 122 and at least one first touch electrode 132.

In the complete contraction state (e.g., complete contraction state 510) of the flexible display 120, as the entire area of the transparent window 130 overlaps the flexible display 120, the entirety of at least one first touch electrode 132 on the transparent window 130 may be arranged to correspond to a part of the second touch electrodes 122. According to an arranged location, addresses may be consecutively re-allocated to all of the second touch electrodes 122 and at least one first touch electrode 132.

Based on a position of the projection area overlapping the transparent window 130 or at least one first touch electrode 132 on the transparent window 130, a reception address (e.g., at least one of reception electrode lines R00-R19) of the flexible display 120 may be allocated to at least one first touch electrode 132. The processor 210 may recognize a sensing value from at least one first touch electrode 132 as a sensing value of the reception address (e.g., at least one of reception electrode lines R00-R19). In case that a transmission address (e.g., at least one of transmission electrode lines T00-T39) of the flexible display 120 is allocated to at least one first touch electrode 132 on the transparent window 130, a driving signal to be applied to the transmission address (e.g., at least one of transmission electrode lines T00-T39) may be applied to the at least one first touch electrode 132 to allow touch detection on a corresponding touch cell.

By way of example, at least one first touch electrode 132 arranged on the transparent window 130 corresponds to a reception electrode and may be arranged in parallel with at least one of the second touch electrodes 122 (reception electrodes) arranged on the projection area of the flexible display 120.

Based on the transparent window 130 or at least one first touch electrode 132 on the transparent window 130 overlapping a portion (the projection area) of the touch area, the processor 210 may activate at least one first touch electrode 132 and use the same. For example, the processor 210 may control touch sensitivity of a sensing signal output from at least one first touch electrode 132 to be higher than a default value. As such, touch sensitivity degradation due to a thickness of the transparent window 130 and a gap between the transparent window 130 and the flexible display 120 may be prevented, thereby improving touch performance.

For another example, at least one first touch electrode 132 arranged on the transparent window 130 corresponds to a transmission electrode and may be arranged in parallel with at least one of the third touch electrodes 124 (transmission electrodes) arranged on the projection area of the flexible display 120.

Based on the transparent window 130 or at least one first touch electrode 132 overlapping a portion (the projection area) of the touch area, the processor 210 may activate at least one first touch electrode 132 on the transparent window 130 and use the same. For example, the processor 210 may control transmission power of a driving signal input to at least one first touch electrode 132 to be higher than a default value. As such, touch sensitivity degradation due to a thickness of the transparent window 130 and a gap between the transparent window 130 and the flexible display 120 may be prevented, thereby improving touch performance.

Hereinafter, a touch control method of an electronic device according to an embodiment will be described with reference to FIGS. 6A, 6B, 7A, and 7B.

The touch control method shown in FIGS. 6A, 6B, 7A, and 7B may be performed by an electronic device (e.g., the electronic device 100 or the processor 210 in FIGS. 1A and 1B). For convenience, it is assumed that each operation is performed by the processor 210 in FIGS. 1A and 1B. The processor 210 may be configured to perform at least a part of operations of the touch control method according to an embodiment. In various embodiments, at least one of described operations may be omitted, the order of some operations may be changed, or another operation may be added.

Referring to FIGS. 6A, 6B, 7A, and 7B, it is assumed that the second touch electrodes 122 (reception electrodes) and the third touch electrodes 124 (transmission electrodes) intersecting with each other are included on the touch area of the flexible display 120, and at least one first touch electrode 132 arranged on the transparent window 130 is formed in parallel with the second touch electrodes 122 of the flexible display 120 to be used as a reception electrode. This touch structure or electrode structure is merely an example for explanation and a range of embodiments is not limited exemplified structure. For example, the first touch electrode 132 arranged on the transparent window 130 may be arranged in parallel with the third touch electrodes 124 (transmission electrodes) of the flexible display 120.

As shown in FIGS. 1A to 1B, the electronic device 100 may include the flexible display 120 being capable of sliding movement. The electronic device 100 may include the transparent window 130 arranged to allow a portion of the flexible display 120 to be projected.

The electronic device 100 may include the housing 110, the flexible display 120 slidably coupled to the rotation body 150 which is a guide structure inside the housing 110, the transparent window 130 arranged in the housing 110 to allow a portion of the flexible display 120 to be projected, and the transparent electrode layer 132a arranged between the transparent window 130 and the flexible display 120.

The second touch electrodes 122 (transmission electrodes) for detecting a touch and the third touch electrodes 124 (reception electrode) may be arranged on the flexible display 120 of the electronic device 100. Identification information (e.g., addresses) may be allocated (configured) to the second touch electrodes 122 and the third touch electrodes 124. Addressing for the second touch electrodes 122 and the third touch electrodes 124 may be performed. Reception addresses may be consecutively allocated to the second touch electrodes 122. Transmission addresses may be consecutively allocated to the third touch electrodes 124.

At least one first touch electrode 132 may be arranged on the transparent window 130. At least one first touch electrode 132 may be used as a transmission electrode or a reception electrode to replace a transmission electrode (or touch electrodes) or a reception electrode (or touch electrodes) arranged on a partial area (projection area) of the flexible display 120 drawn into the housing 110 so as to prevent degradation in touch sensitivity or touch performance due to a thickness of the transparent window 130. To this end, at least one first touch electrode 132 on the transparent window 130 may be arranged in parallel with the second touch electrodes 122 or the third touch electrodes 124. At least one first touch electrode 132 may be realized to have a location, interval, length or width, or shape to correspond to at least one second touch electrode 122 or at least one third touch electrode 124.

Figure 6A:
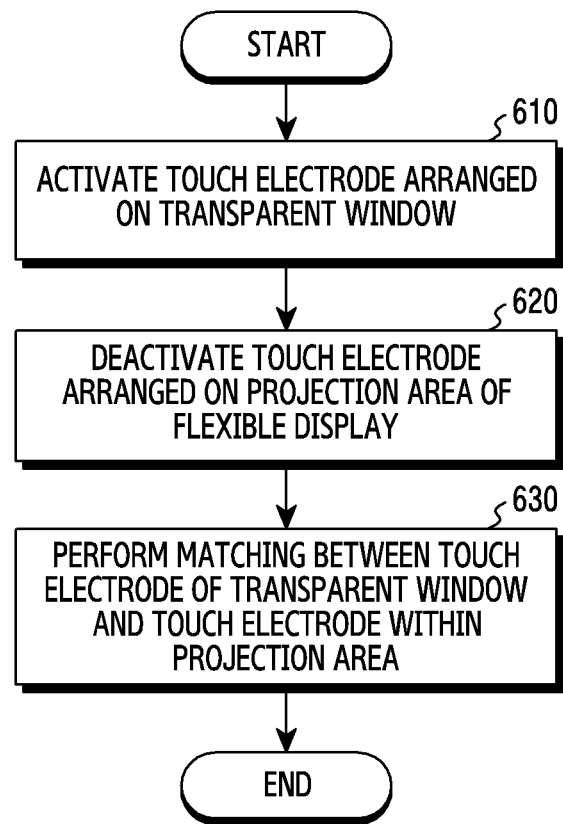
FIG. 6A is a flowchart illustrating a touch control method of an electronic device according to an embodiment of the disclosure.

FIG. 6A is a flowchart illustrating a touch control method of an electronic device according to an embodiment of the disclosure.

Referring to FIG. 6A, the touch control method of an electronic device according to an embodiment may include operation 610, operation 620, and operation 630.

Identification information (e.g., an address) may be configured (allocated) in advance to each of touch electrodes 122 and 124 of the flexible display 120 and at least one first touch electrode 132 of the transparent window 130.

In operation 610, the processor 210 may activate at least one first touch electrode 132 arranged on the transparent window 130.

In operation 620, the processor 210 may deactivate at least one touch electrode arranged on a partial area (projection area) of the flexible display 120, which is projected through the transparent window 130, among multiple touch electrodes (e.g., the second touch electrodes 122) arranged on the flexible display 120.

The processor 210 may identify (or determine) the projection area of the flexible display 120 or at least one touch electrode (e.g., a first part of the second touch electrodes 122) positioned on the projection area.

In operation 630, the processor 210 may control at least one first touch electrode 132 arranged on the transparent window 130 to be matched to the identified at least one touch electrode (e.g., the first part). Identification information (e.g., an address) of the matched at least one touch electrode (e.g., the first part) may be allocated to at least one first touch electrode 132.

In case that the first touch electrode 132 of the transparent window 130 is a reception electrode, the processor 210 may control touch sensitivity of a sensing signal output from the first touch electrode 132 of the transparent window 130 to be higher than a default value (e.g., a default value for reception electrodes of the flexible display 120).

In case that the first touch electrode 132 of the transparent window 130 is a transmission electrode, the processor 210 may control transmission power of a driving signal input to a touch electrode of the transparent window 130 to be higher than a default value (e.g., a default value for transmission electrodes of the flexible display 120).

Figure 6B:
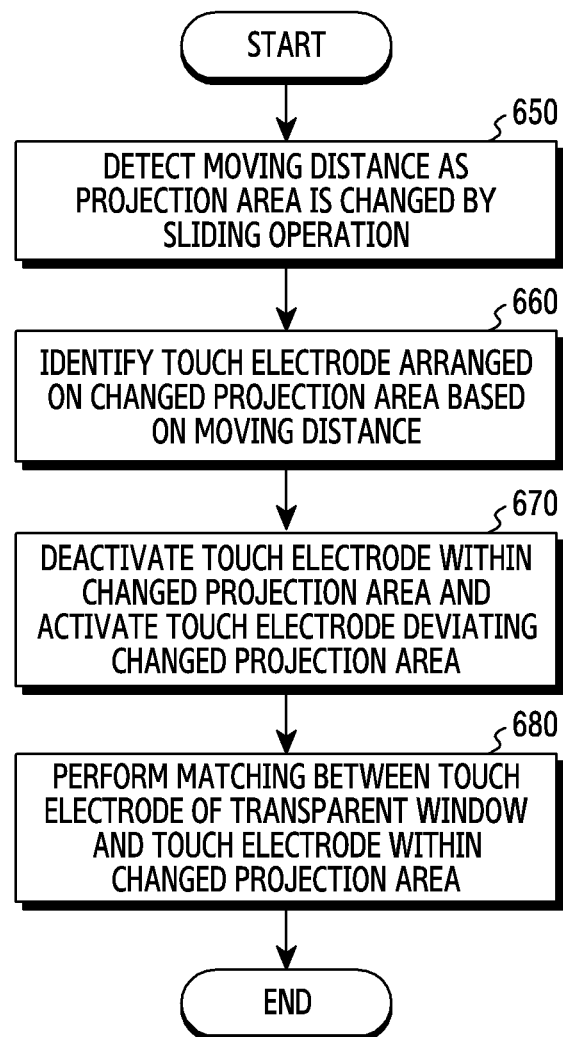
FIG. 6B is a flowchart illustrating a touch control method of an electronic device according to an embodiment of the disclosure.

FIG. 6B is a flowchart illustrating a touch control method of an electronic device according to an embodiment of the disclosure.

Referring to FIG. 6B, the touch control method of an electronic device according to an embodiment may include operation 650, operation 660, operation 670, and operation 680. By way of example, the touch control method of an electronic device shown in FIG. 6B may be performed subsequent to FIG. 6A.

In operation 650, as a projection area of the flexible display 120 is changed by the sliding operation of the flexible display 120, the processor 210 may detect a moving distance through at least one sensor.

In operation 660, based on the moving distance, the processor 210 may identify a changed projection area or at least one touch electrode (e.g., a second part of the second touch electrodes 122) arranged on the changed projection area.

In operation 670, the processor 210 may deactivate at least one touch electrode (e.g., the second part) within the changed projection area and activate at least one touch electrode (e.g., the second part) deviating the changed projection area.

In operation 680, the processor 210 may control at least one first touch electrode 132 to be matched to at least one touch electrode (e.g., the second part) within the changed projection area.

The processor 210 may change identification information of at least one first touch electrode 132 on the transparent window 130 to identification information (e.g., an address) of the matched at least one touch electrode (e.g., the second part).

The processor 210 may detect a touch by using activated touch electrodes (e.g., touch electrodes excluding the second part) among multiple touch electrodes arranged on the flexible display 120 and at least one first touch electrode 132 which has been matched to deactivated at least one touch electrode (e.g., the second part).

Figure 7A:
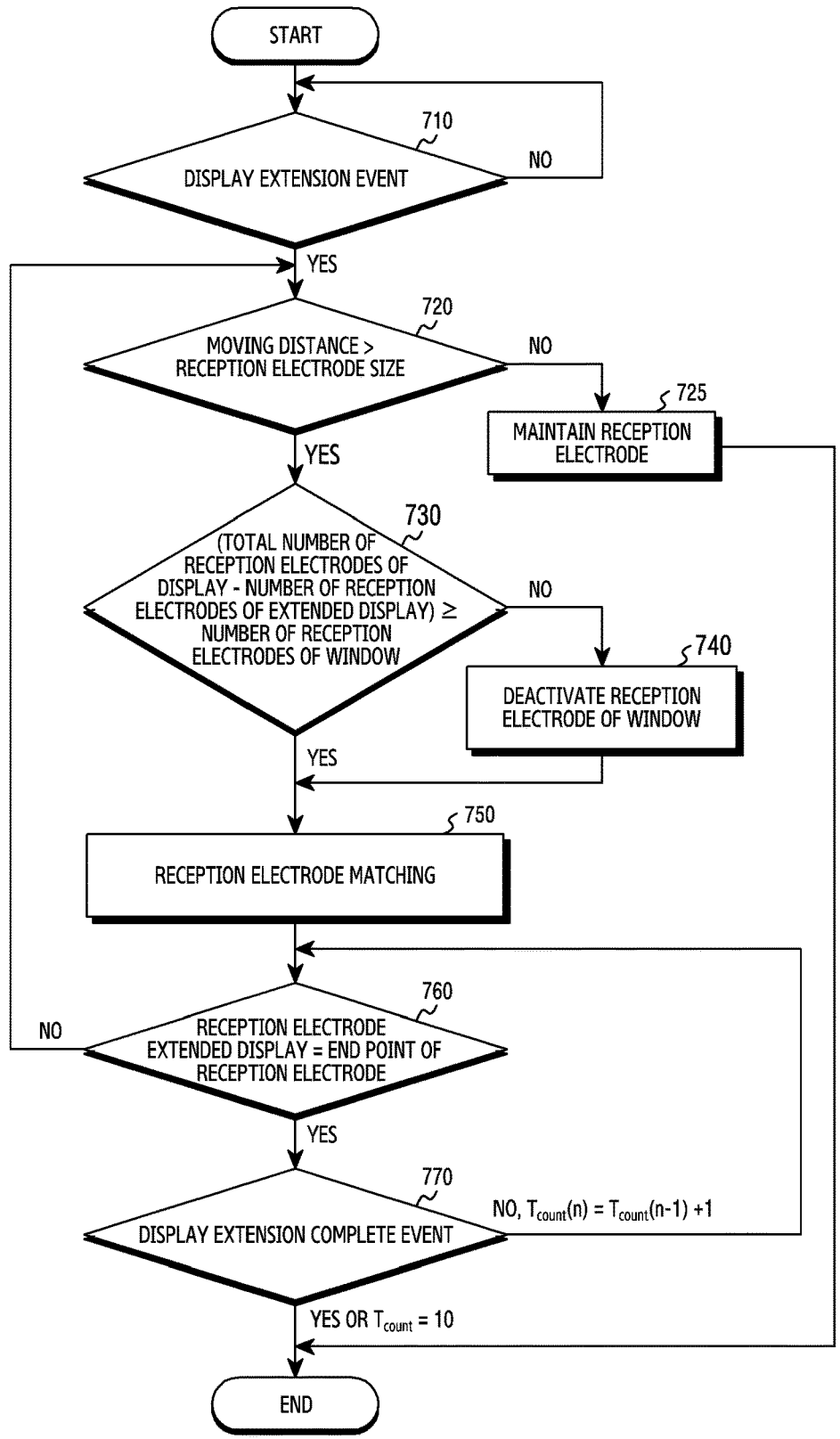
FIG. 7A is a flowchart illustrating a touch control method of an electronic device in case that a display is extended in according to an embodiment of the disclosure.

FIG. 7A is a flowchart illustrating a touch control method of an electronic device in case that a display is extended in according to an embodiment of the disclosure. FIG. 7A illustrates a reception electrode matching operation according to extension of a flexible display in case that at least one first touch electrode arranged on a transparent window is a reception electrode according to an embodiment of the disclosure.

In operation 710, the processor 210 may detect occurrence of a display extension event by using at least one sensor. For example, the display extension event may be detected in response to a sliding-out operation of drawing out the flexible display 120 from the housing 110.

As occurrence of a display extension event is detected, the processor 210 may identify a mechanical state (extension/contraction state) or a moving distance of the flexible display 120 by using at least one sensor. By way of example, the mechanical state of the flexible display 120 may correspond to one of a basic state (complete contraction state or complete drawn-in state), an extending state (or contracting state), and a complete extension state (or complete drawn-out state). For example, the moving distance of the flexible display 120 may be sensed by comparison with the basic state. For example, the moving distance of the flexible display 120 may be sensed by comparison with a previous state.

Operation 720 and operation 730 may be performed to identify an extension/contraction state or a moving distance of the flexible display 120.

In operation 720, the processor 210 may determine whether the moving distance (extension distance) of the flexible display 120 according to the sliding operation (sliding-out operation) is greater than a size (width) (or interval between reception electrodes) of one reception electrode.

As a result of the determination in operation 720, in case that the moving distance (extension distance) of the flexible display 120 is smaller than or equal to the size of one reception electrode, in operation 725, the processor 210 may maintain a pre-configured identification information (e.g., an address). Identification information (e.g., an address) allocated to reception electrodes of the flexible display 120 may be maintained.

As a result of the determination in operation 720, in case that the moving distance (extension distance) of the flexible display 120 is greater than the size of one reception electrode, a state of the flexible display 120 may be determined as the extending state. For example, the processor 210 may calculate a difference value obtained by subtracting the number of reception electrodes of an extended flexible display 120 (a main area exposed to the outside of the housing 110) from the total number of reception electrodes of the flexible display 120 and compare the difference value with the number of reception electrodes of the transparent window 130. In case that the difference value is smaller than the number of reception electrodes of the transparent window 130, it may be determined that the transparent window 130 deviates from the touch area of the flexible display 120 (e.g., the complete extension state or complete drawn-out state), and in operation 740, at least one first touch electrode 132 arranged on the transparent window 130 may be deactivated. A part or the entirety of at least one first touch electrode 132 arranged on the transparent window 130 overlapping the touch area of the flexible display 120 may be inactivated.

In case that the difference value is greater than or equal to the number of reception electrodes of the transparent window 130, it may be determined that the transparent window 130 or at least one first touch electrode 132 on the transparent window 130 overlaps the touch area of the flexible display 120. In operation 750, the processor 210 may perform a reception electrode matching operation. By way of example, based on the moving distance (extension distance) of the flexible display 120, the processor 210 may identify at least one reception electrode (e.g., a first part of reception electrode lines R00-R19) to be arranged on the projection area among entire reception electrodes (e.g., reception electrode lines R00-R19) of the flexible display 120 and match a first touch electrode 132 of the transparent window 130 to the identified at least one reception electrode.

In operation 760, the processor 210 may determine whether the number of reception electrodes of an extended flexible display 120 (a main area exposed to the outside of the housing 110) reaches the total number of reception electrodes of the flexible display 120.

As a result of the determination in operation 760, in case that the number of reception electrodes of an extended flexible display 120 does not reach the total number of reception electrodes of the flexible display 120, the processor 210 may return to operation 720 to re-identify whether a state is in the extending state and may repeatedly perform operation 720, operation 730, operation 740, and operation 750 according to an identification result.

As a result of the determination in operation 760, in case that the number of reception electrodes of an extended flexible display 120 reaches the total number of reception electrodes of the flexible display 120, a state of the flexible display 120 may be identified as the complete extension state (or complete drawn-out state). For example, the processor 210 may proceed to operation 770 and stand by occurrence of a display extension completion event. The stand-by operation may be performed a predetermined number of times (e.g., Tcount=10 times) or for a certain period of time.

In case that occurrence of a display extension completion event is detected in operation 770 (e.g., in case that the sliding-out operation is seized for a predetermined period of time), the electrode matching operation according to the display extension event may be ended.

Figure 7B:
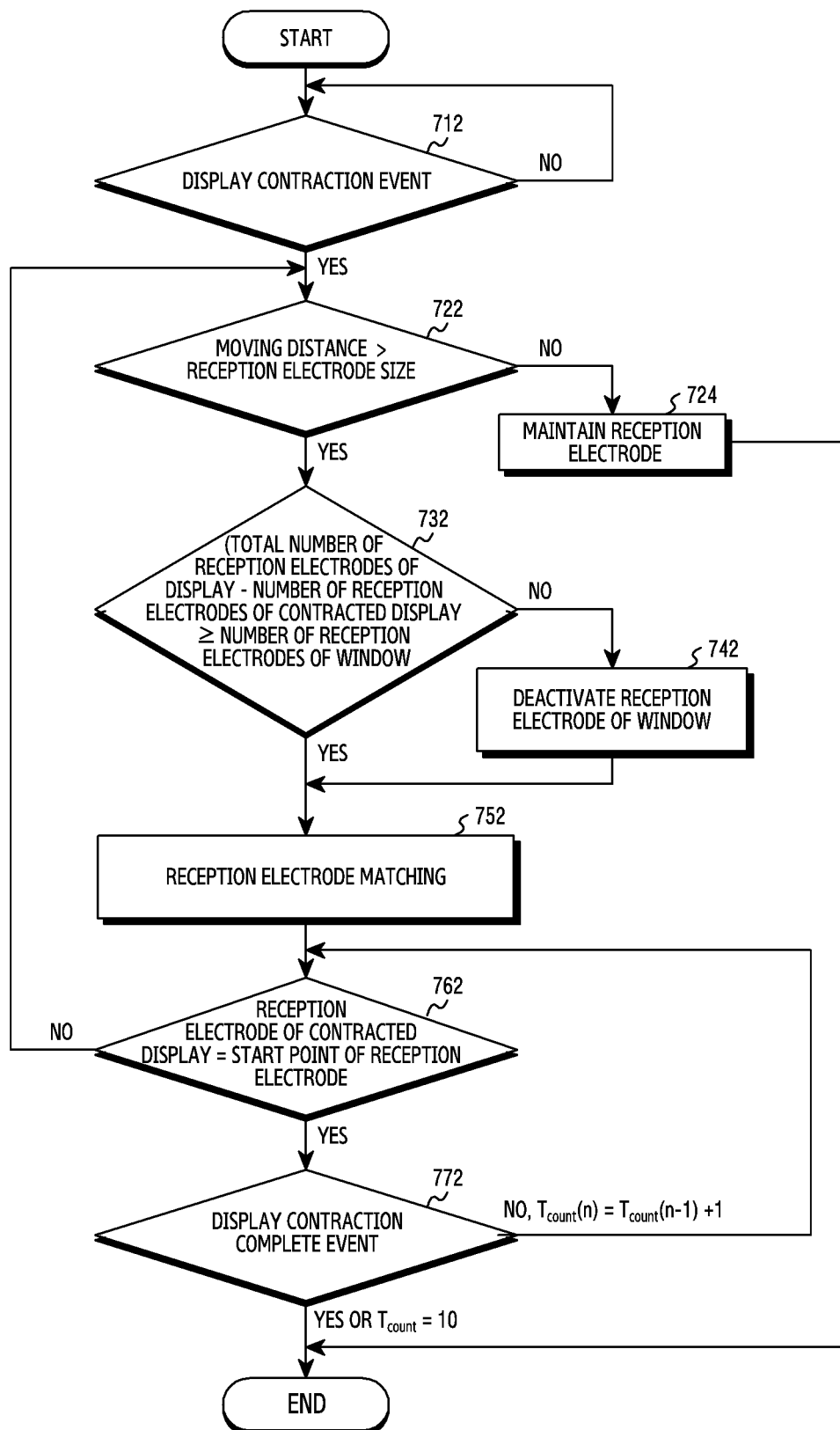
FIG. 7B is a flowchart illustrating a touch control method of an electronic device in case that a display is contracted in according to an embodiment of the disclosure.

FIG. 7B is a flowchart illustrating a touch control method of an electronic device in case that a display is contracted in an embodiment of the disclosure. FIG. 7B illustrates a reception electrode matching operation according to contraction of a flexible display in case that at least one first touch electrode arranged on a transparent window is a reception electrode.

In operation 712, the processor 210 may detect occurrence of a display contraction event by using at least one sensor. For example, the display contraction event may be detected in response to a sliding-in operation of drawing the flexible display 120 into the housing 110.

As occurrence of a display contraction event is detected, the processor 210 may identify a mechanical state (extension/contraction state) or a moving distance of the flexible display 120 by using at least one sensor. By way of example, the mechanical state of the flexible display 120 may correspond to one of a basic state (complete contraction state or complete drawn-in state), an extending state (or contracting state), and a complete extension state (or complete drawn-out state). For example, the moving distance of the flexible display 120 may be sensed by comparison with the basic state. For example, the moving distance of the flexible display 120 may be sensed by comparison with a previous state.

Operation 722 and operation 732 may be performed to identify an extension/contraction state or a moving distance of the flexible display 120.

In operation 722, the processor 210 may determine whether the moving distance (contraction distance) of the flexible display 120 according to the sliding-in operation (contraction operation) is greater than a size (width) (or interval between reception electrodes) of one reception electrode.

As a result of the determination in operation 722, in case that the moving distance (contraction distance) of the flexible display 120 is smaller than or equal to the size of one reception electrode, in operation 724, the processor 210 may maintain a pre-configured identification information (e.g., an address). Identification information (e.g., an address) allocated to reception electrodes of the flexible display 120 may be maintained.

As a result of the determination in operation 722, in case that the moving distance (contraction distance) of the flexible display 120 is greater than the size of one reception electrode, a state of the flexible display 120 may be determined as the contracting state. For example, the processor 210 may calculate a difference value obtained by subtracting the number of reception electrodes of a contracted flexible display 120 (a main area exposed to the outside of the housing 110) from the total number of reception electrodes of the flexible display 120 and compare the difference value with the number of reception electrodes of the transparent window 130. In case that the difference value is smaller than the number of reception electrodes of the transparent window 130, the processor 210 may determine that the transparent window 130 deviates from the touch area of the flexible display 120 (e.g., the complete extension state or complete drawn-out state), and in operation 742, may deactivate at least one first touch electrode 132 arranged on the transparent window 130. A part or the entirety of at least one first touch electrode 132 arranged on the transparent window 130 overlapping the touch area of the flexible display 120 may be inactivated.

In case that the difference value is greater than or equal to the number of reception electrodes of the transparent window 130, the processor 210 may determine that the transparent window 130 or at least one first touch electrode 132 on the transparent window 130 overlaps the touch area of the flexible display 120 (e.g., the contracting state) to proceed to operation 752.

In operation 752, the processor 210 may perform a reception electrode matching operation. By way of example, based on the moving distance (contraction distance) of the flexible display 120, the processor 210 may identify at least one reception electrode (e.g., a first part of reception electrode lines R00-R19) to be arranged on the projection area among entire reception electrodes (e.g., reception electrode lines R00-R19) of the flexible display 120 and match a first touch electrode 132 of the transparent window 130 to the identified at least one reception electrode.

In operation 762, the processor 210 may determine whether the number of reception electrodes of a contracted flexible display 120 (a main area exposed to the outside of the housing 110) reaches the total number of reception electrodes of the flexible display 120.

As a result of the determination in operation 762, in case that the number of reception electrodes of a contracted flexible display 120 does not reach the total number of reception electrodes of the flexible display 120, the processor 210 may return to operation 722 to re-identify whether a state is in the contracting state and may repeatedly perform operation 722, operation 732, operation 742, and operation 752 according to an identification result.

As a result of the determination in operation 762, in case that the number of reception electrodes of a contracted flexible display 120 reaches the total number of reception electrodes of the flexible display 120, a state of the flexible display 120 may be identified as the complete contraction state (or complete drawn-in state). For example, the processor 210 may proceed to operation 772 and stand by occurrence of a display contraction completion event. The stand-by operation may be performed a predetermined number of times (e.g., Tcount=10 times) or for a certain period of time.

In case that occurrence of a display contraction completion event is detected in operation 772 (e.g., in case that the sliding-in operation is seized for a predetermined period of time), the reception electrode operation of the transparent window 130 according to the display contraction event may be ended.

Figure 8:
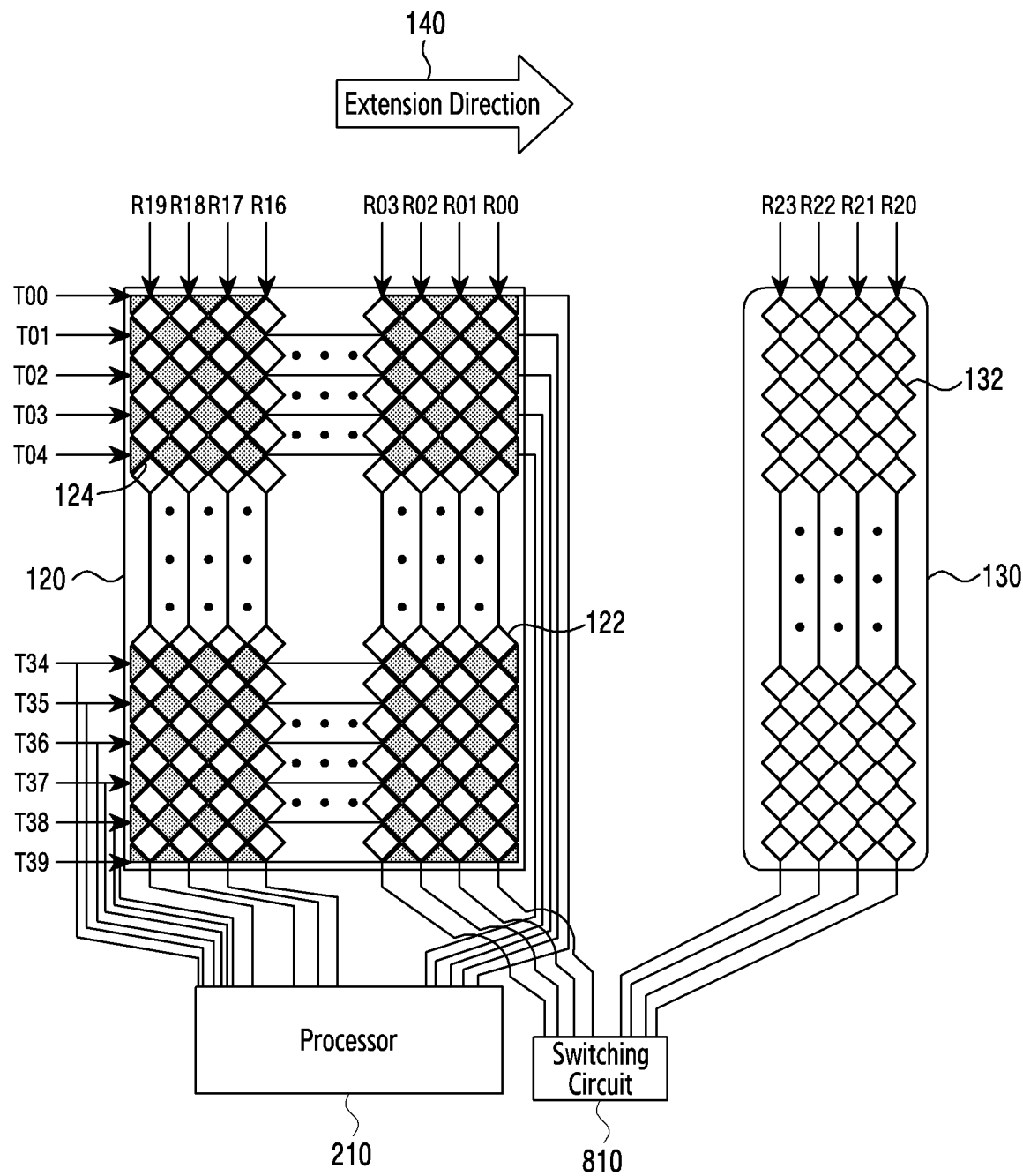
FIG. 8 is a view illustrating a touch structure of an electronic device according to an embodiment of the disclosure.

FIG. 8 is a view illustrating a touch structure of an electronic device according to an embodiment of the disclosure.

Referring to FIG. 8, the electronic device 100 may include the flexible display 120, the transparent window 130, and the processor 210 described above. The electronic device 100 may further include a switching circuit 810.

At least one first touch electrode 132 (e.g., reception electrodes of reception electrode lines R20-R23) may be arranged on the transparent window 130. The second touch electrodes 122 (e.g., reception electrodes) and the third touch electrodes 124 (e.g., transmission electrodes) may be arranged on the flexible display 120. Reception addresses (e.g., reception electrode lines R00-R19) may be consecutively allocated to the second touch electrodes 122. Transmission addresses (e.g., transmission electrode lines T00-T39) may be consecutively allocated to the third touch electrodes 124. At least one first touch electrode 132 arranged on the transparent window 130 may be arranged in parallel with one of the second touch electrodes 122 and the third touch electrodes 124 and may replace a role of a transmission electrode or a reception electrode depending on a location of the projection area overlapping the transparent window 130 or at least one first touch electrode 132 on the transparent window 130.

The processor 210 may be electrically and/or operatively connected to the flexible display 120 and the transparent electrode layer 132a. The flexible display 120 and the transparent window 130 may be connected to each other through the switching circuit 810. The switching circuit 810 may be controlled by the processor 210. The switching circuit 810 may include one or more switches.

In an embodiment, the switching circuit 810 may alternately activate at least one first touch electrode 132 arranged on the transparent electrode layer 132a and at least one of the second touch electrodes 122 arranged on the flexible display 120.

The switching circuit 810 may be turned on/turned off according to a location of the projection area overlapping the transparent window 130 or at least one first touch electrode 132 on the transparent window 130 and may activate/deactivate at least one first touch electrode 132 arranged on the transparent window 130. At least one first touch electrode 132, when activated, may operate as a touch electrode replacing a part disposed on the projection area among the second touch electrodes 122 of the flexible display 120. At least one first touch electrode 132, when deactivated, may not operate as a touch electrode.

By way of example, reception electrodes (e.g., reception electrode lines R00-R03) disposed at one end (an area visually exposed in the complete extension state or the complete drawn-out state) of the flexible display 120 may be electrically connected to first touch electrodes 132 (e.g., reception electrode lines R20-R23) of the transparent window 130 through the switching circuit 810. The switching circuit 810 may be turned on/turned off based on a mechanical state (extension/contraction state) or a moving distance of the flexible display 120.

In accordance with extension of the flexible display 120, the processor 210 may recognize a touch (e.g., existence of a touch or touch coordinates) by matching (mapping) a first touch electrode 132 (e.g., reception electrode lines R20-R23) which corresponds to a physically operating reception electrode and a reception electrode (e.g., reception electrode lines R04-R19) recognized by the processor 210. In case that the flexible display 120 is extended up to the complete extension state (or complete drawn-out state), the touch area of the flexible display 120 may deviate from the transparent window 130. For example, the processor 210 may control the switching circuit 810 so that reception electrodes (e.g., reception electrode lines R00-R03) on the flexible display 120 operate. According to this method, in case that the number of physical electrode pin allocation of a detection circuit in the processor 210 is insufficient, touch electrodes may be controlled to increase the number of electrodes through the switching circuit 810.

Figure 9A:
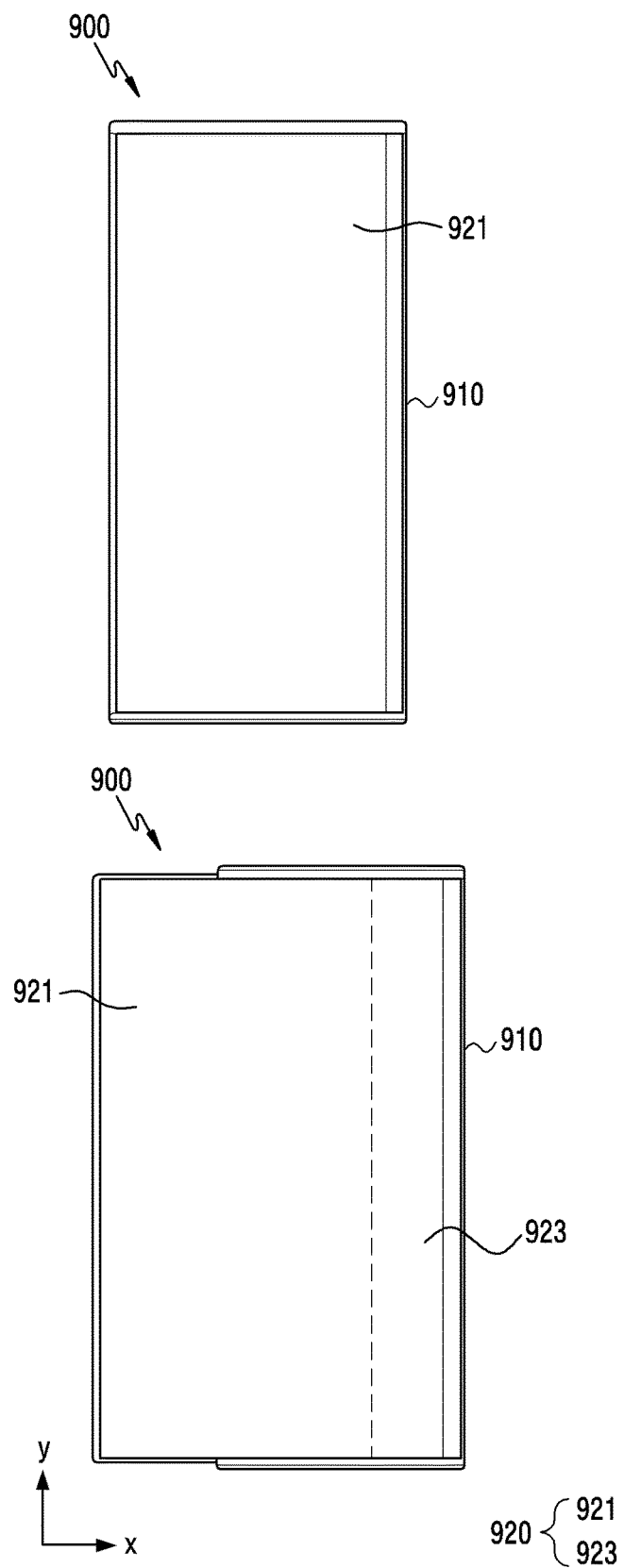
FIG. 9A is a planar view illustrating a front surface of an electronic device according to an embodiment of the disclosure.
Figure 9B:
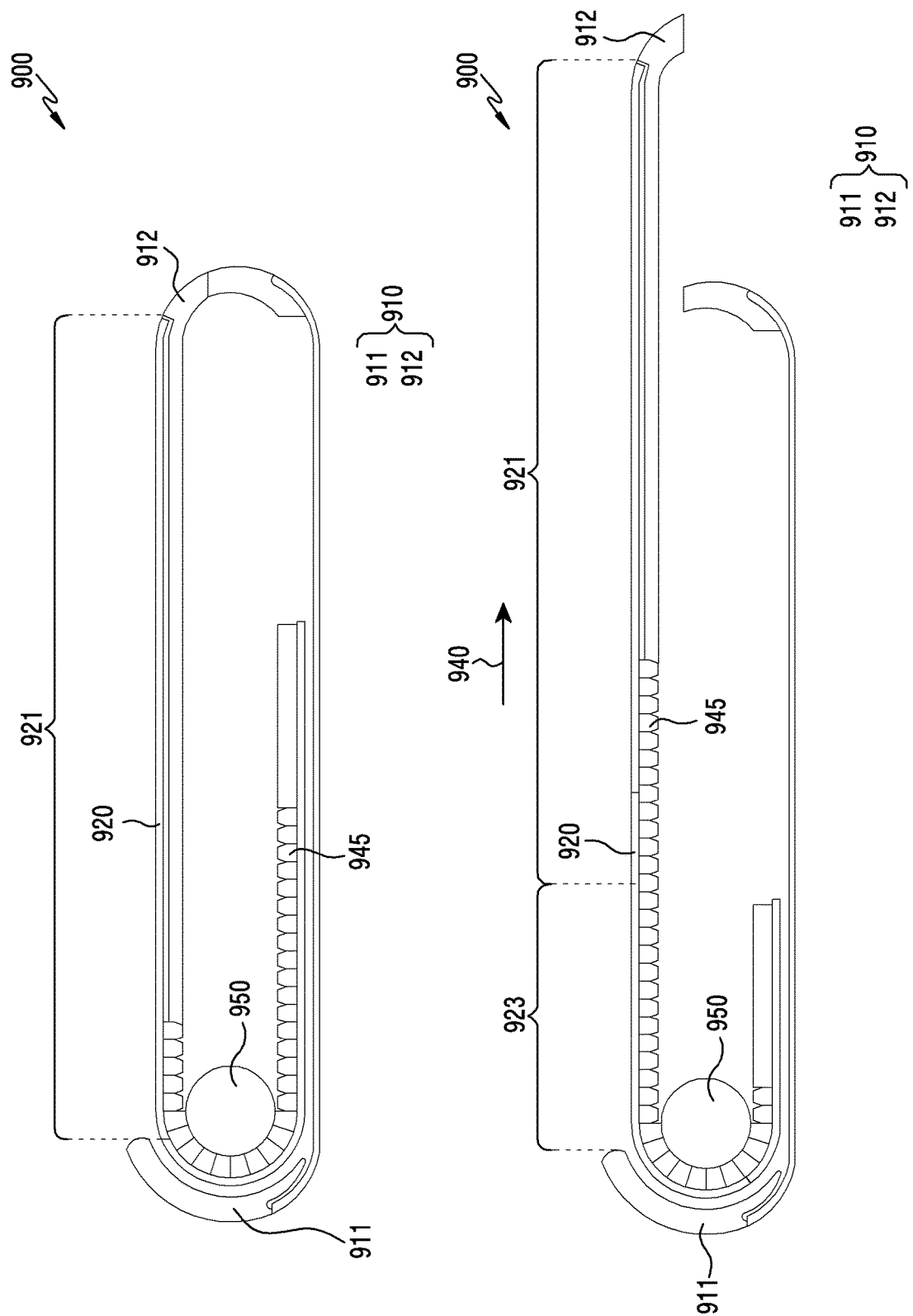
FIG. 9B illustrates a sectional view of an electronic device according to an embodiment of the disclosure.
Figure 9C:
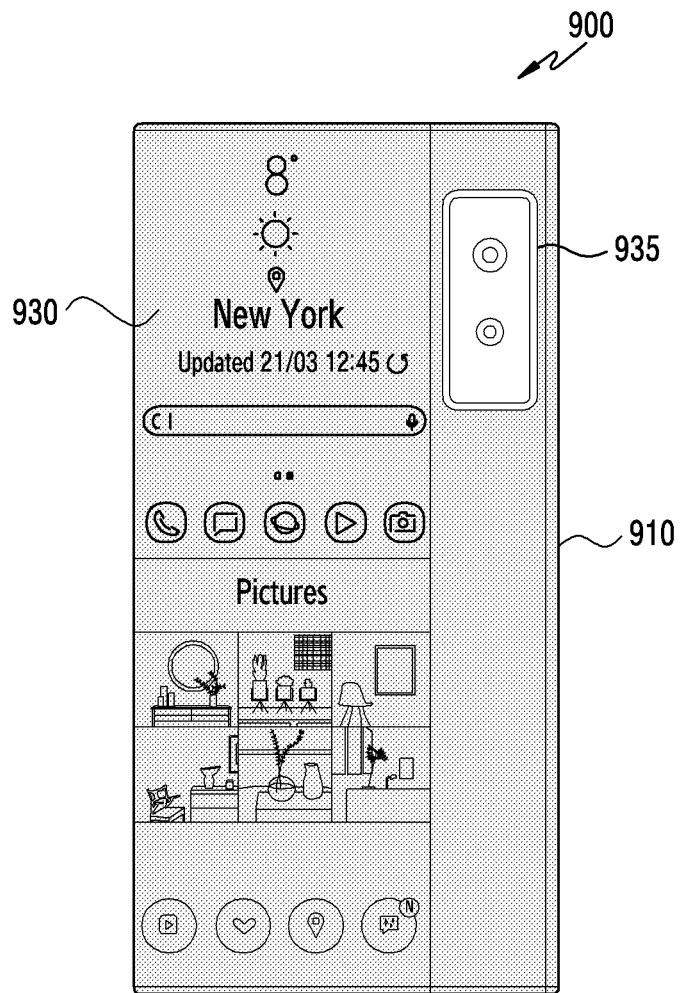
FIG. 9C is a planar view illustrating a rear surface of an electronic device according to an embodiment of the disclosure.

FIG. 9A is a planar view illustrating a front surface of an electronic device according to an embodiment of the disclosure. FIG. 9B illustrates a sectional view of an electronic device according to an embodiment of the disclosure. FIG. 9C is a planar view illustrating a rear surface of an electronic device according to an embodiment of the disclosure.

Referring to FIGS. 9A and 9B, a flexible display 920 (e.g., the display module 1260 in FIG. 12) of an electronic device 900 (e.g., the electronic device 1201 in FIG. 12) may be extended or contracted according to a mechanical state change of a housing 910. As shown in the drawing, the flexible display 920 may be a slidable display.

The electronic device 900 may include the housing 910 extendable/contractible by the sliding operation. The electronic device 900 may include a first housing 911 and a second housing 912 slidably coupled to be movable within a predetermined range with respect to the first housing 911. In case that the second housing 912 moves in a first direction 940 (e.g., a horizontal direction) with respect to the first housing 911, a size of the housing 910 may increase, and in case that the second housing 912 moves in a second direction opposite to the first direction, a size of the housing 910 may be reduced. According to extension/contraction of the housing 910, a size of the entire electronic device 900 or the flexible display 920 may be increased and/or reduced.

A multi-joint support plate 945 and a rotation body 950 for the sliding operation may be included inside the housing 910. The flexible display 920 may be slid-in and/or slid-out according to the multi-joint support plate 945 and the rotation body 950 to be extended in the first direction 940 or contracted in the second direction opposite to the first direction 940.

According to an embodiment, a maximum distance between the first housing 911 and the second housing 912 may be increased or reduced according to movement (sliding movement) of the second housing 912 with respect to the first housing 911. For example, in case that the first housing 911 forms one edge of the electronic device 900 and the second housing 912 forms the other edge, a distance between the one edge and the other lateral edge may vary according to extension of the flexible display 920.

The electronic device 900 may include the flexible display 920. As shown in the drawing, the flexible display 920 may be a slidable display. The flexible display 920 may include a first area 921 which is a main area always exposed to the outside and a second area 923 which is an alpha area selectively exposed to the outside. The second area 923 of the flexible display 920 may be slid-in into or slid-out from the housing 910. In case that the second area 923 is slid-in, the second area 923 may be exposed to the outside, and in case that the second area 923 is slid-out, the second area 923 may not be exposed to the outside.

In case that the second housing 912 moves in the first direction 940 with respect to the first housing 911, the second area 923 of the flexible display 920 is exposed to the outside so that the flexible display 920 may be extended. In case that the second housing 912 moves in the second direction opposite to the first direction 940 with respect to the first housing 911, the second area 923 of the flexible display 920 is slid-in into the housing 910 so that the flexible display 920 may be contracted.

The extension and/or contraction of the electronic device 900, the housing 910, or the flexible display 920 may mean increase and/or reduction of a size of a portion visually exposed to the outside, among entire area of the housing 910 or the flexible display 920, according to the movement of the second housing 912 with respect to the first housing 911.

By way of example, the mechanical state of the electronic device 900, the housing 910, and the flexible display 920 may be referred to as a complete contraction state (or complete drawn-in state) in which contraction is maximized, an extending state (or contracting state), and a complete extension state (or complete drawn-out state) in which extension is maximized.

Referring to FIG. 9C, the electronic device 900 may include a transparent window 930 for covering the rear surface thereof. The transparent window 930 may be a portion of the housing 910 or a structure coupled to the housing 910. Reference numeral 935 may indicate a camera area.

The electronic device 900 may include the transparent window 930 disposed on the housing 910 to allow a partial area of the flexible display 920 drawn into the housing 910 to be projected therethrough.

Referring to FIG. 9C, in case that the electronic device 900 including a slidable structure includes the transparent window 930 (e.g., back glass) for covering the rear surface, a partial area of the flexible display 920 is slid-in according to a mechanical state (e.g., the complete contraction state, the extending state, and the contracting state) to overlap the transparent window 930 disposed on the rear surface of the electronic device 900 or at least one first touch electrode (e.g., first touch electrode 932 in FIG. 10) on the transparent window 930. Accordingly, with respect to a partial area of the flexible display 920 disposed on the rear surface of the electronic device 900, touch recognition may be difficult or impossible due to the transparent window 930.

The touch structure and touch control method (channel matching method) of the electronic device 100 (a rollable-type electronic device) according to an embodiment described above with reference to FIGS. 1A, 1B, 2A, 2B, 2C, 3, 4, 5A to 5E, 6A, 6B, 7A, 7B, and 8 is applicable to the electronic device 900 (a slidable-type electronic device) described with reference to FIGS. 9A, 9B, and 10. A touch structure and a touch control method using the touch structure of the transparent window 930 will be described in detail with reference to FIG. 10.

Figure 10:
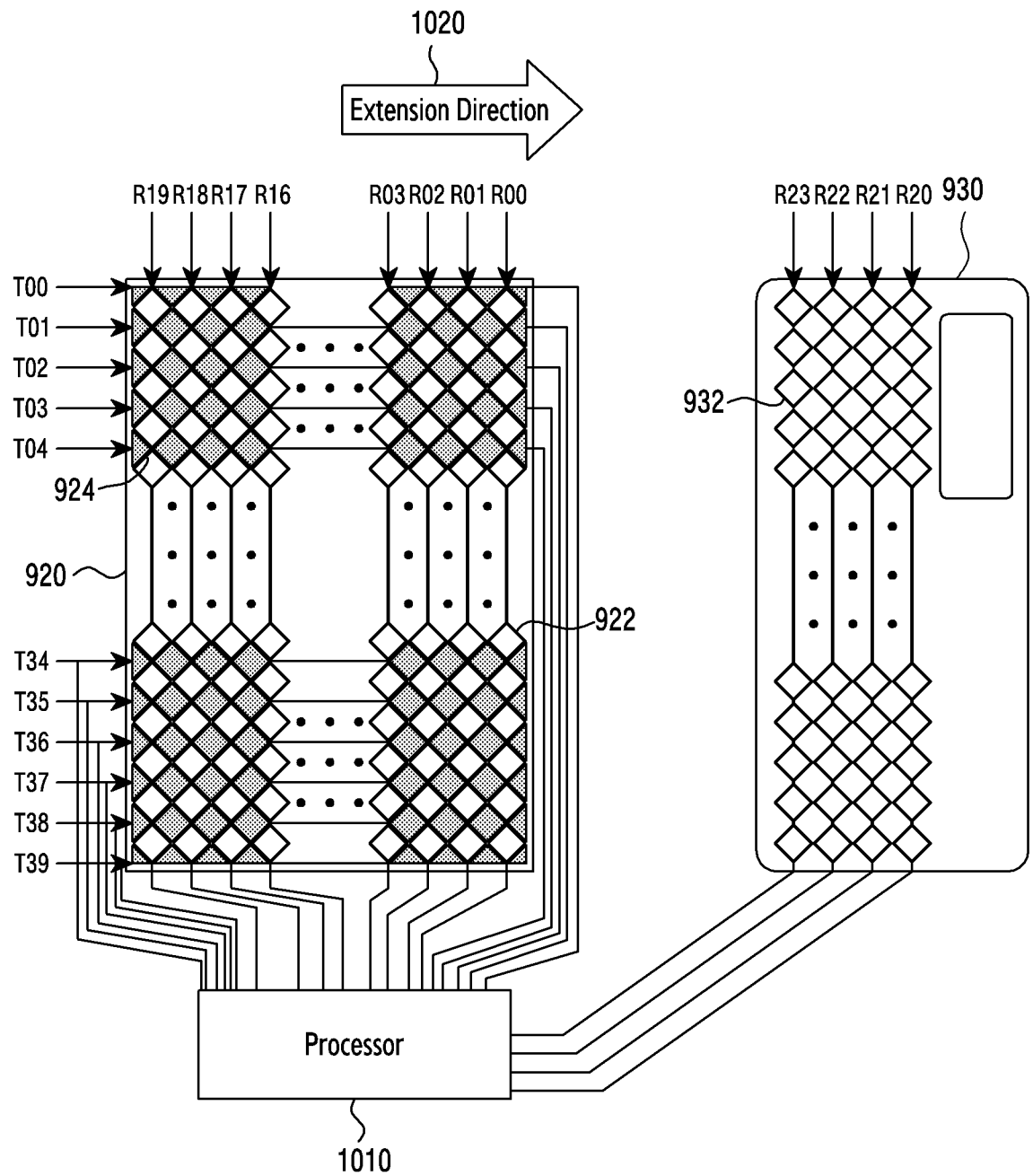
FIG. 10 is a view illustrating a touch structure of an electronic device according to an embodiment of the disclosure.

FIG. 10 is a view illustrating a touch structure of an electronic device according to an embodiment of the disclosure.

Referring to FIG. 10, an electronic device 900 may include a flexible display 920 (slidable display), a transparent window 930 coupled to the rear surface of the electronic device 900, and a processor 1010.

The electronic device 900 including the flexible display 920 may detect a moving distance (e.g., an extension/contraction distance) or a mechanical state (e.g., an extension/contraction state) of the flexible display 920 by using a sensor structure. For example, the sensor structure may include a touch sensor, an optical sensor, a Hall sensor, a gyro sensor, and or an acceleration sensor. Second touch electrodes 922 (reception electrodes) and third touch electrodes 924 (transmission electrodes) may be formed on the flexible display 920.

At least one first touch electrode 932 may be arranged on the transparent window 930.

The electronic device 900 may sense a moving distance or a mechanical state (extension/contraction state) according to the sliding operation of the flexible display 920 through the sensor structure. The electronic device 900 may perform matching between a first touch electrode 932 in the transparent window 930 and touch electrodes (transmission electrodes or reception electrodes) of the flexible display 920, based on the sensed value. A first touch electrode 932 on the transparent window 930 may be used as a portion of touch electrodes (transmission electrodes or reception electrodes) of the flexible display 920. The electronic device 900 may recognize a touch by sensing a capacitance change between matched electrodes.

FIG. 10 exemplifies an electrode addressing scheme for electrode matching between a flexible display and a transparent window for covering a rear surface. In the embodiment of FIG. 10, second touch electrodes 922 are reception electrodes. Third touch electrodes 924 are transmission electrodes. A first touch electrode 932 on the transparent window 930 may be arranged in parallel with one of two touch electrodes 922 and 924. By way of example, the first touch electrode 932 of the transparent window 930 may be arranged in parallel with the second touch electrodes 922 which are reception electrodes to be used as a reception electrode.

In the basic state (complete contraction state) of the electronic device 900, addresses of reception electrode lines R00-R19 may be allocated to the first touch electrodes 932 within the flexible display 920. Addresses of transmission electrode lines T00-T39 may be allocated to the second touch electrodes 922 within the flexible display 920. Reception addresses of reception electrode lines R20-R23 may be allocated to the first touch electrodes 932 of the transparent window 930.

The processor 1010 may perform matching between touch electrodes base on a size change (extension/contraction) of the flexible display 920 according to the sliding operation to control touch detection.

In the basic state (complete contraction state) in which the flexible display 920 is completed contracted, some (e.g., reception electrode lines R00-R03) of the second touch electrodes 922 may be positioned on the projection area overlapping the transparent window 130 or at least one first touch electrode 132 (e.g., reception electrode lines R20-R23) on the transparent window 130. For example, in place of reception electrodes of reception electrode lines R00-R03 within the flexible display 920, reception electrodes with reception electrode lines R20-R23 on the transparent window 930 may be activated and used. The processor 1010 may sense a capacitance change between the reception electrodes of reception electrode lines R20-R23 on the transparent window 930 and the transmission electrodes of transmission electrode lines T00-T39 within the flexible display 920 so as to recognize a touch with respect to the projection area.

In case that the flexible display 920 is slid-out to be extended along a first direction 1020 (extension direction), a position of the projection area (positions of reception electrodes of reception electrode lines R20-R23 on the transparent window 930) may be changed according to a moving distance (extension distance) of the flexible display 920. As the position of the projection area is changed, among the second touch electrodes 122 within the flexible display 920, a portion overlapping the first touch electrodes 132 may be changed. The processor 1010 may perform electrode matching based on a moving distance (extension distance) of the flexible display 920 and identify (or determine) at least one electrode to be replaced by at least one first touch electrode 932 (reception electrode), among the second touch electrodes 922 (reception electrodes) of the flexible display 920. In the same manner, in case that the flexible display 920 is slid-out to be contracted in the second direction opposite to the first direction 1020, the processor 1010 may control touch detection by electrode matching.

Figure 11A:
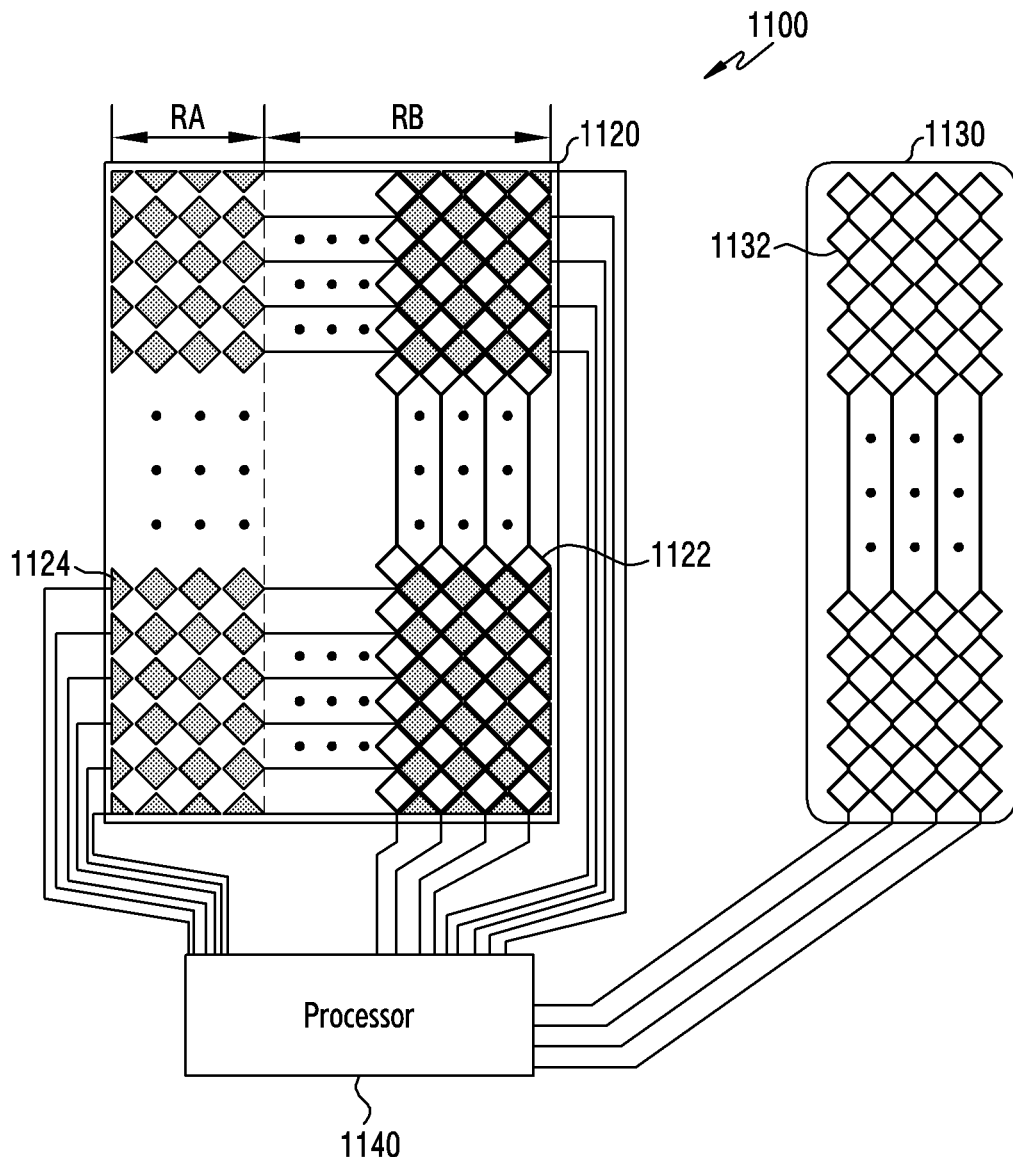
FIG. 11A is a view illustrating a touch structure of an electronic device according to an embodiment of the disclosure.

FIG. 11A is a view illustrating a touch structure of an electronic device according to an embodiment of the disclosure.

A structure similar to that of the electronic device 100 in FIGS. 1A and 1B or that of the electronic device 900 in FIGS. 9A, 9B, and 9C may be applied to an electronic device 1100 shown in FIG. 11A. For example, a flexible display 1120 may be, but is not limited to, a rollable display or a slidable display. The electronic device 1100 may include a housing (not shown), a flexible display 1120, and a transparent window 1130. The electronic device 1100 may include a transparent electrode layer (not shown) on which at least one first touch electrode 1132 is arranged. The electronic device 1100 may include at least one processor 1140 electrically connected to the flexible display 1120 and the transparent electrode layer.

The flexible display 1120 may include a first touch area RA and a second touch area RB. In the embodiment of FIG. 11A, only a transmission electrode is arranged on the first touch area RA. Both a reception electrode and a transmission electrode are arranged on the first touch area RA.

At least one third touch electrode 1124 (e.g., at least one transmission electrode line arranged in the row direction) may be arranged on the first touch area RA of the flexible display 1120. Only one (e.g., a transmission electrode) of two kinds of electrodes 1122 and 1124 (a transmission electrode and a reception electrode) may be arranged on the first touch area RA.

Multiple second touch electrodes 1122 (e.g., reception electrode lines in the column direction) and multiple third touch electrodes 1124 (e.g., transmission electrode lines in the row direction) may be arranged on the second touch area RB of the flexible display 1120. For another example, the second touch electrodes 1122 and the third touch electrodes 1124 may be arranged to intersect with each other.

By way of example, the first touch area RA may be an area disposed on one end (an area visually exposed to the outside in the complete extension state or the complete drawn-out state) of the flexible display 1120. In some states (e.g., the complete extension state or the complete drawn-in state), the processor 1140 may recognize a touch with respect to the first touch area RA by using touch electrodes (e.g., transmission electrodes) of the first touch area RA and touch electrodes (e.g., reception electrodes) on the transparent window 1130.

At least one first touch electrode 1132 (e.g., at least one reception electrode arranged in the column direction) may be arranged on the transparent window 1130. By way of example, the first touch electrode 1132 on the transparent window 1130 may be arranged to intersect (e.g., cross at right angles) with one electrode (e.g., a third touch electrode 1124 corresponding to a transmission electrode) existing on the first touch area RA among two types of touch electrodes 1122 and 1124 (a transmission electrode and a reception electrode) of the flexible display 1120. The first touch electrode 1132 on the transparent window 1130 may be arranged to be perpendicular to another electrode (e.g., a second touch electrode 1122 corresponding to a reception electrode) not existing on the first touch area RA among two types of touch electrodes 1122 and 1124 (a transmission electrode and a reception electrode) of the flexible display 1120.

Referring to FIG. 11A, in case that at least one first touch electrode 1132 on the transparent window 1130 is a reception electrode, the first touch electrode 1132 may be arranged to intersect (e.g., cross at right angles) with the third touch electrode 1124 (transmission electrode) of the flexible display 1120.

For another example, in case that at least one first touch electrode 1132 on the transparent window 1130 is a transmission electrode, the first touch electrode 1132 may be arranged to intersect (e.g., cross at right angles) with the second touch electrode 1122 (reception electrode) of the flexible display 1120.

Figure 11B:
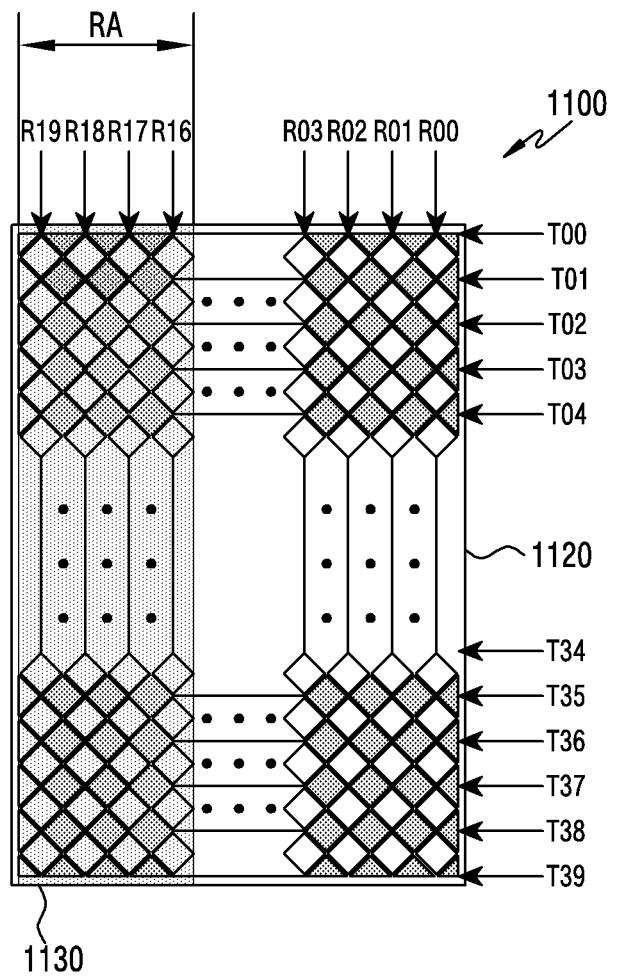
FIG. 11B is a view illustrating an electrode addressing scheme of an electronic device according to an embodiment of the disclosure.

FIG. 11B is a view illustrating an electrode addressing scheme of an electronic device according to an embodiment of the disclosure.

Referring to FIG. 11A, at least one reception electrode (the first touch electrode 1132) on the transparent window 1130 may be arranged in parallel with reception electrodes (the second touch electrodes 1122) of the flexible display 1120 and arranged to intersect with transmission electrodes (the third touch electrodes 1124) of the flexible display 1120.

Reception electrodes within the second touch area RB of the flexible display 1120 may be allocated with addresses of reception electrode lines R00-R15. Transmission electrodes within the second touch area RB of the flexible display 1120 may be allocated with addresses of transmission electrode lines T00-T39. Addresses of reception electrode lines R16-R19 may be allocated to reception electrodes of the transparent window 1130.

Referring to FIG. 11B, reception electrodes of reception electrode lines R00-R15 and transmission electrodes of transmission electrode lines T00-T39 may be arranged on the flexible display 1120. Reception electrodes of reception electrode lines R20-R23 may be arranged on the transparent window 130.

In the basic state (complete contraction state or complete drawn-in state) and the intermediate state (extending/contracting state) of the electronic device 100, reception electrodes of reception electrode lines of R16-R19 of the transparent window 1130 may be matched (or mapped) to some reception electrodes arranged on the projection area among reception electrodes of reception electrode lines R00-R15 of the flexible display 1120 to be used for touch recognition. In case that the projection area is changed by the sliding operation, the reception electrode of reception electrode lines R16-R19 of the transparent window 1130 may be matched (or mapped) to reception electrodes within the projection area to be used for touch recognition.

In the complete extension state (or complete drawn-out state) of the electronic device 100, the first touch area RA may correspond to a projection area projected through the transparent window 1130. The electronic device 100 may recognize a touch with respect to the first touch area RA by using reception electrodes of reception electrode lines R16-R19 and transmission electrodes of transmission electrode lines T00-T39.

Figure 12:
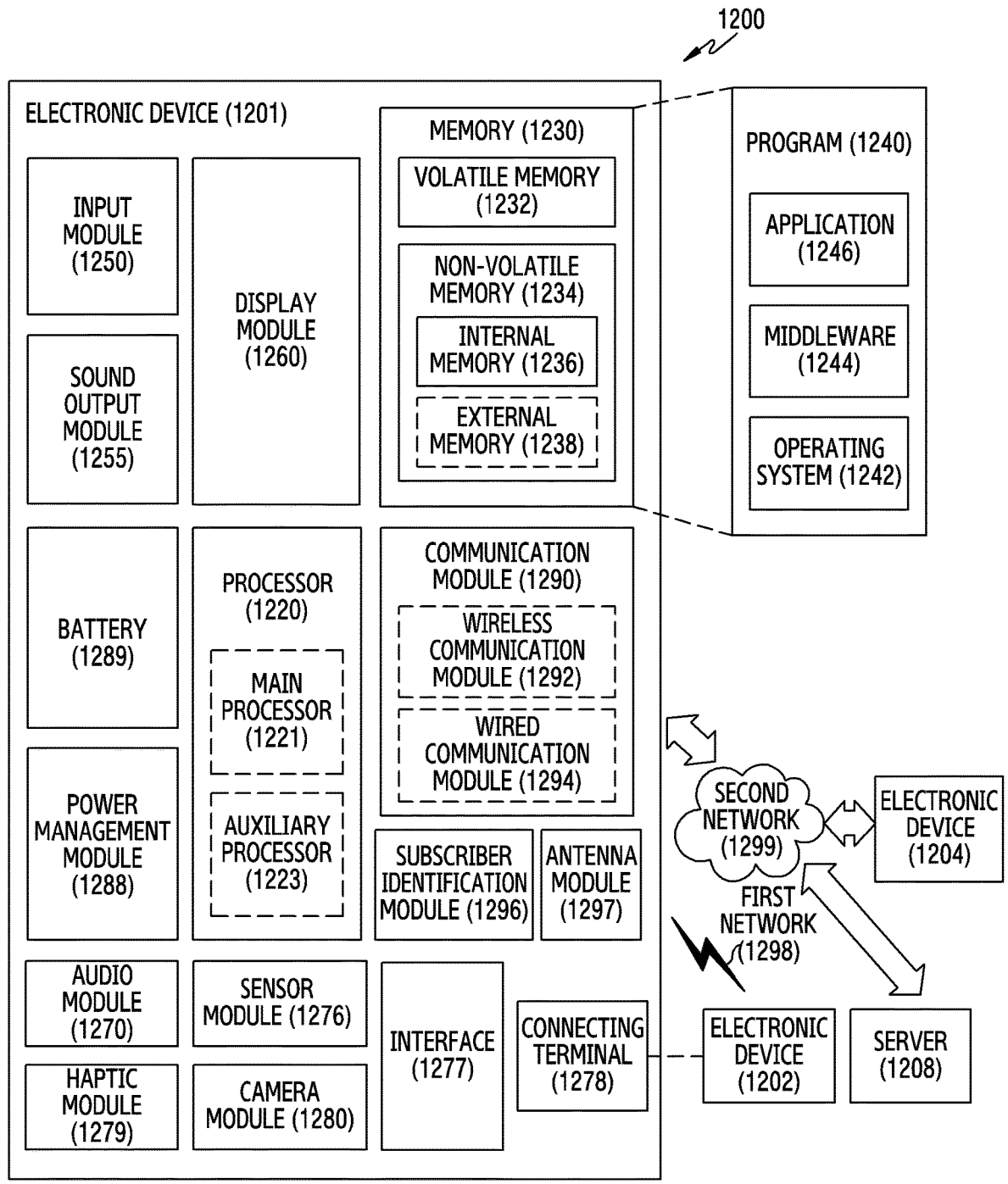
FIG. 12 is a block diagram illustrating an electronic device in a network environment according to an embodiment of the disclosure.

FIG. 12 is a block diagram of an electronic device in a network environment, according to an embodiment of the disclosure.

Referring to FIG. 12, an electronic device 1201 in a network environment 1200 may communicate with an electronic device 1202 via a first network 1298 (e.g., a short-range wireless communication network), or at least one of an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module (SIM) 1296, or an antenna module 1297. In some embodiments, at least one of the components (e.g., the connecting terminal 1278) may be omitted from the electronic device 1201, or one or more other components may be added in the electronic device 1201. In some embodiments, some of the components (e.g., the sensor module 1276, the camera module 1280, or the antenna module 1297) may be implemented as a single component (e.g., the display module 1260).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, when the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., the neural processing unit) may include a hardware structure specified for artificial intelligence model processing. An artificial intelligence model may be generated by machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1230 may store various data used by at least one component (e.g., the processor 1220 or the sensor module 1276) of the electronic device 1201. The various data may include, for example, software (e.g., the program 1240) and input data or output data for a command related thererto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user) of the electronic device 1201. The input module 1250 may include, for example, a microphone, a mouse, a keyboard, a key (e.g., a button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment, the display module 1260 may include a touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255 or a headphone of an external electronic device (e.g., the electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

The connecting terminal 1278 may include a connector via which the electronic device 1201 may be physically connected with the external electronic device (e.g., the electronic device 1202). According to an embodiment, the connecting terminal 1278 may include, for example, an HDMI connector, a USB connector, an SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, a $5^{th}$ generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the mmWave band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the electronic device 1204), or a network system (e.g., the second network 1299). According to an embodiment, the wireless communication module 1292 may support a peak data rate (e.g., 20 gigabits per second (Gbps) or more) for implementing eMBB, loss coverage (e.g., 1264 decibels (dB) or less) for implementing mMTC, or U-plane latency (e.g., 0.5 milliseconds (ms) or less for each of downlink (DL) and uplink (UL), or a round trip of 12 ms or less) for implementing URLLC.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., a printed circuit board (PCB)). According to an embodiment, the antenna module 1297 may include a plurality of antennas (e.g., array antennas). In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to various embodiments, the antenna module 1297 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 or 1204 may be a device of a same type as, or a different type, from the electronic device 1201. According to an embodiment, all or some of operations to be executed at the electronic device 1201 may be executed at one or more of the external electronic devices (e.g., the electronic devices 1202 and 1204 or the server 1208). For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example. The electronic device 1201 may provide ultra low-latency services using, e.g., distributed computing or mobile edge computing. In an embodiment, the external electronic device 1204 may include an internet-of-things (IoT) device. The server 1208 may be an intelligent server using machine learning and/or a neural network. According to an embodiment, the external electronic device 1204 or the server 1208 may be included in the second network 1299. The electronic device 1201 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device (e.g., the electronic device 100 in FIGS. 1A and 1B, the electronic device 900 in FIG. 9A, and the electronic device 1100 in FIG. 11A) according to various embodiments may include a housing (e.g., the housing 110 in FIGS. 1A and 1B, and the housing 910 in FIG. 9A) a flexible display (e.g., the flexible display 120 in FIGS. 1A and 1B, the flexible display 920 in FIG. 9A, and the flexible display 1120 in FIG. 11A) that is drawn into the housing or drawn out from the housing by a sliding operation, a transparent window (e.g., the transparent window 130 in FIGS. 1A and 1B, the transparent window 930 in FIG. 9C, and the transparent window 1130 in FIG. 11A) disposed in the housing so that a partial area of the flexible display drawn into the housing is projected therethrough, and a transparent electrode layer (e.g., the transparent electrode layer 132*a* in FIG. 1B) disposed between the transparent window and the flexible display. At least one first touch electrode may be disposed in the transparent electrode layer.

According to various embodiments, the at least one first touch electrode (e.g., the first touch electrode 132 in FIG. 2A, the first touch electrode 932 in FIG. 10, and the first touch electrode 1132 in FIG. 11A) arranged on the transparent electrode layer may be activated, and at least one second touch electrode (e.g., a portion of the second touch electrodes 122 in FIG. 2A, a portion of the second touch electrodes 922 in FIG. 9A, and a portion of the second touch electrodes 1122 in FIG. 11A) may be deactivated.

According to various embodiments, as the partial area is changed by the sliding operation, at least one second touch electrode arranged on the changed area may be deactivated, and at least one second touch electrode deviating the changed area may be activated.

The electronic device according to various embodiments may further include at least one processor (e.g., the processor 210 in FIG. 2A, the processor 1010 in FIG. 10, and the processor 1140 in FIG. 11A) electrically connected to the flexible display and the transparent electrode layer.

According to various embodiments, the at least one processor may be configured to match the at least one first touch electrode to at least one second touch electrode arranged on the partial area.

According to various embodiments, the at least one processor may be configured to, in case that the partial area is changed by the sliding operation, detect a moving distance of the flexible display through at least one sensor and identify the changed area or at least one second touch electrode arranged on the changed area based on the moving distance.

According to various embodiments, the at least one processor may be configured to, in case that the partial area is changed by the sliding operation, match the at least one first touch electrode to at least one second touch electrode arranged on the changed area.

According to various embodiments, in a complete drawn-out state of the flexible display, a location of the at least one first touch electrode arranged on the transparent electrode layer may deviate from a touch area of the flexible display and the at least one first touch electrode may be deactivated.

According to various embodiments, the at least one first touch electrode may correspond to a reception electrode and may be arranged in parallel with at least one reception electrode arranged on the partial area.

According to various embodiments, touch sensitivity of a sensing signal output from the at least one first touch electrode may be controlled to be higher than a default value.

According to various embodiments, the at least one first touch electrode may correspond to a transmission electrode and may be arranged in parallel with at least one transmission electrode arranged on the partial area.

According to various embodiments, transmission power of a driving signal input to the at least one first touch electrode may be controlled to be higher than a default value.

The electronic device according to various embodiments may further include a switching circuit for alternately activating the at least one first touch electrode arranged on the transparent electrode layer and at least one second touch electrode arranged on the partial area.

According to various embodiments, the at least one first touch electrode may correspond to a transmission electrode and may be arranged to intersect with at least one reception electrode arranged on the partial area.

According to various embodiments, the at least one first touch electrode may correspond to a reception electrode and may be arranged to intersect with at least one transmission electrode arranged on the partial area.

A method according to various embodiments relates to a touch control method for an electronic device including a housing, a flexible display slidably coupled to the housing, a transparent window disposed in the housing so that a partial area of the flexible display is projected therethrough, and a transparent electrode layer disposed between the transparent window and the flexible display, the touch control method including an operation of activating at least one first touch electrode disposed on the transparent electrode layer, an operation of deactivating at least one second touch electrode disposed on a partial area of the flexible display, and an operation of performing control so that the at least one first touch electrode is matched the at least one second touch electrode.

The method according to various embodiments may further include, in case that the partial area is changed by the sliding operation, an operation of detecting a moving distance of the flexible display and an operation of identifying the changed area or at least one second touch electrode arranged on the changed area based on the moving distance.

The method according to various embodiments may further include, in case that the partial area is changed by the sliding operation, an operation of deactivating at least one second touch electrode arranged on the changed area and activating at least one second touch electrode deviating the changed area and an operation of controlling the at least one first touch electrode to be matched to the at least one second touch electrode arranged on the changed area.

In the method according to various embodiments, the at least one first touch electrode corresponds to a reception electrode, and touch sensitivity of a sensing signal output from the at least one first touch electrode may be controlled to be higher than a default value.

In the method according to various embodiments, the at least one first touch electrode corresponds to a transmission electrode, and transmission power of a driving signal input to the at least one first touch electrode may be controlled to be higher than a default value.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a flexible display configured to be drawn into the housing or drawn out from the housing by a sliding operation;
   a transparent window disposed in the housing, a partial area of the flexible display drawn into the housing being visible through the transparent window; and
   a transparent electrode layer disposed on one surface of the transparent window facing the partial area and being arranged between the transparent window and the flexible display,
   wherein at least one first touch electrode is arranged in the transparent electrode layer.

2. The electronic device of claim 1,
   wherein the at least one first touch electrode arranged in the transparent electrode layer is activated, and
   wherein at least one second touch electrode arranged in the partial area is deactivated.

3. The electronic device of claim 2,
   wherein, as the partial area changes to a changed area by the sliding operation, one or more second touch electrodes arranged on the changed area is deactivated, and
   wherein, as the partial area changes by the sliding operation, one or more second touch electrodes arranged outside of the changed area is activated.

4. The electronic device of claim 1, further comprising:
   at least one processor electrically connected to the flexible display and the transparent electrode layer.

5. The electronic device of claim 4, wherein the at least one processor is configured to match the at least one first touch electrode to at least one second touch electrode arranged on the partial area.

6. The electronic device of claim 4, wherein the at least one processor is configured to:
   based on the partial area changing to a changed area by the sliding operation, detect a moving distance of the flexible display through at least one sensor; and
   based on the moving distance, identify the changed area or at least one second touch electrode arranged on the changed area.

7. The electronic device of claim 4, wherein the at least one processor is configured to, based on the partial area changing to a changed area by the sliding operation, match the at least one first touch electrode to at least one second touch electrode arranged on the changed area.

8. The electronic device of claim 1, wherein, in a complete drawn-out state of the flexible display:
   a location of the at least one first touch electrode arranged on the transparent electrode layer deviates from a touch area of the flexible display; and
   the at least one first touch electrode is deactivated.

9. The electronic device of claim 1,
   wherein the at least one first touch electrode corresponds to a reception electrode, and
   wherein the at least one first touch electrode is arranged in parallel with at least one reception electrode arranged on the partial area.

10. The electronic device of claim 9, wherein touch sensitivity of a sensing signal output from the at least one first touch electrode is controlled to be higher than a default value.

11. The electronic device of claim 1, wherein the transparent electrode layer is attached to the one surface of the transparent window by a transparent adhesive film.

12. The electronic device of claim 1,
   wherein the flexible display is drawn into the housing and drawn out from the housing through an opening of the housing, and
   wherein a portion of the housing separates the opening from the transparent window.

13. A touch control method of an electronic device comprising a housing, a flexible display slidably coupled to the housing, a transparent window disposed in the housing so that a partial area of the flexible display is visible through the transparent window, and a transparent electrode layer disposed on one surface of the transparent window facing the partial area and being arranged between the transparent window and the flexible display, the method comprising:
   activating at least one first touch electrode disposed on the transparent electrode layer;
   deactivating at least one second touch electrode disposed on the partial area of the flexible display; and
   performing control so that the at least one first touch electrode is matched to the at least one second touch electrode.

14. The method of claim 13, further comprising:
based on the partial area changing to a changed area by a sliding operation, detecting a moving distance of the flexible display; and
based on the moving distance, identifying the changed area or one or more second touch electrodes arranged on the changed area.

15. The method of claim 13, further comprising:
based on the partial area changing to a changed area by a sliding operation, deactivating one or more second touch electrodes arranged on the changed area and activating one or more second touch electrodes arranged outside of the changed area; and
controlling the at least one first touch electrode to be matched to the one or more second touch electrodes arranged on the changed area.

16. The method of claim 13,
wherein the at least one first touch electrode corresponds to a reception electrode, and
wherein touch sensitivity of a sensing signal output from the at least one first touch electrode is controlled to be higher than a default value.

17. The method of claim 13,
wherein the at least one first touch electrode corresponds to a transmission electrode, and
wherein transmission power of a driving signal input to the at least one first touch electrode is controlled to be higher than a default value.

\* \* \* \* \*